(12) United States Patent
Chen et al.

(10) Patent No.: US 8,812,349 B2
(45) Date of Patent: Aug. 19, 2014

(54) CHARGING FOR DATA OFFLOADING

(75) Inventors: Xuming Chen, San Ramon, CA (US);
Jin Yang, Orinda, CA (US); Kalyani Bogineni, Hillsborough, NJ (US);
Praveen Atreya, Jersey City, NJ (US)

(73) Assignees: Cellco Partnership, Basking Ridge, NJ (US); Verizon Patent and Licensing Inc., Basking Ridge, NJ (US)

( * ) Notice: Subject to any disclaimer, the term of this patent is extended or adjusted under 35 U.S.C. 154(b) by 300 days.

(21) Appl. No.: 12/844,228

(22) Filed: Jul. 27, 2010

(65) Prior Publication Data

US 2012/0030143 A1  Feb. 2, 2012

(51) Int. Cl.
  G06Q 99/00 (2006.01)
  G06Q 30/02 (2012.01)
  H04W 40/02 (2009.01)
  H04L 12/56 (2006.01)

(52) U.S. Cl.
  CPC ........... *G06Q 30/0206* (2013.01); *H04W 40/02* (2013.01); *H04L 47/122* (2013.01)
  USPC ........... 705/7.35; 705/400; 370/328; 455/406

(58) Field of Classification Search
  CPC ........... H04F 12/1485; G06Q 30/0283; G06Q 30/016; H04L 12/14; H04L 47/122
  USPC .......................... 705/400, 7.35; 370/252, 329; 455/405–406
  See application file for complete search history.

(56) References Cited

U.S. PATENT DOCUMENTS

| 2008/0229385 A1* | 9/2008 | Feder et al. ..................... 726/1 |
| 2010/0039987 A1* | 2/2010 | Hegde et al. ................. 370/328 |
| 2010/0041365 A1* | 2/2010 | Lott et al. ..................... 455/406 |
| 2011/0075557 A1* | 3/2011 | Chowdhury et al. ......... 370/230 |

OTHER PUBLICATIONS

"Towards a Profitable Mobile Data Business Model: Scenarios for Cost Reduction and Innovative Service Plans", Jan. 2010, V2.01.10, bridgewater Systems, 15 pages.*
Femtocells—Natural Solution for Offload—a Femto Forum topic brief, Jun. 2010, Femto Forum, 37 pages.*
"Towards a Profitable Mobile Data Business Model: Scenarios for Cost Reduction and Innovative Service Plans", Jan. 2010, V2.01.1 0, bridgewater Systems, 15 pages.*
Femtocells—Natural Solution for Offload—a Femto Forum topic brier, Jun. 2010, Femto Forum, 37 pages.*
King, Julia; "Calculating Hidden Cloud Storage Costs—Look out for these ancillary expenditures when you budget for cloud storage", Jul. 13, 2009; White Paper, computerworld.com, 4 pages.*
"Smarter Wi-Fi for Mobile Operator Infrastructures", Jun. 28, 2010, Ruckus Wireless, 7 pages.*

(Continued)

*Primary Examiner* — John Hayes
*Assistant Examiner* — Freda A Nelson

(57) ABSTRACT

A method performed by a wireless node including receiving charging policies for data offloading; performing data offloading with respect to a user data flow; generating charging information associated with data offloading based on the charging policies; and sending the charging information to at least one of an on-line charging function or an off-line charging function.

20 Claims, 21 Drawing Sheets

(56) References Cited

OTHER PUBLICATIONS

Goldstein, Phil, "Bridgewater Scores Data Offloading Contract Wins", Feb. 15, 2010, fiercewireless.com, 2 pages.*

"HP IUM Charging Manager", Sep. 2007, a communications, media and entertainment white paper from HP, 12 pages.*

"Metro Zone Wi-Fi for Cellular Data Offloading", Dec. 9, 2010, White Paper, WAViON Wireless Networks, 12 pages.*

"Bridgewater Unveils New Mobile Data Offload Solutions", Feb. 15, 2010, BackboneMag.com, 2 pages.*

Honore, Stephanie; "Preparing for Policy 2.0 and the Unfulfilled 3GPP Charging Expectations", Jul. 1, 2010, openwave.com; 3 pages.*

Seidel, Eiko and Saad, Elie; "LTE Home Node Bs and its Enhancements in Release 9", Mai 2010, Nomor Research GmbH, Munich, Germany, 5 pages.*

Ghattas, Ihab; "Wireless Broadband Technologies LTE the Way Forward " Apr. 13-15, 2010; ITU Centre of Excellence Cairo, Egypt, 43 pages.*

* cited by examiner

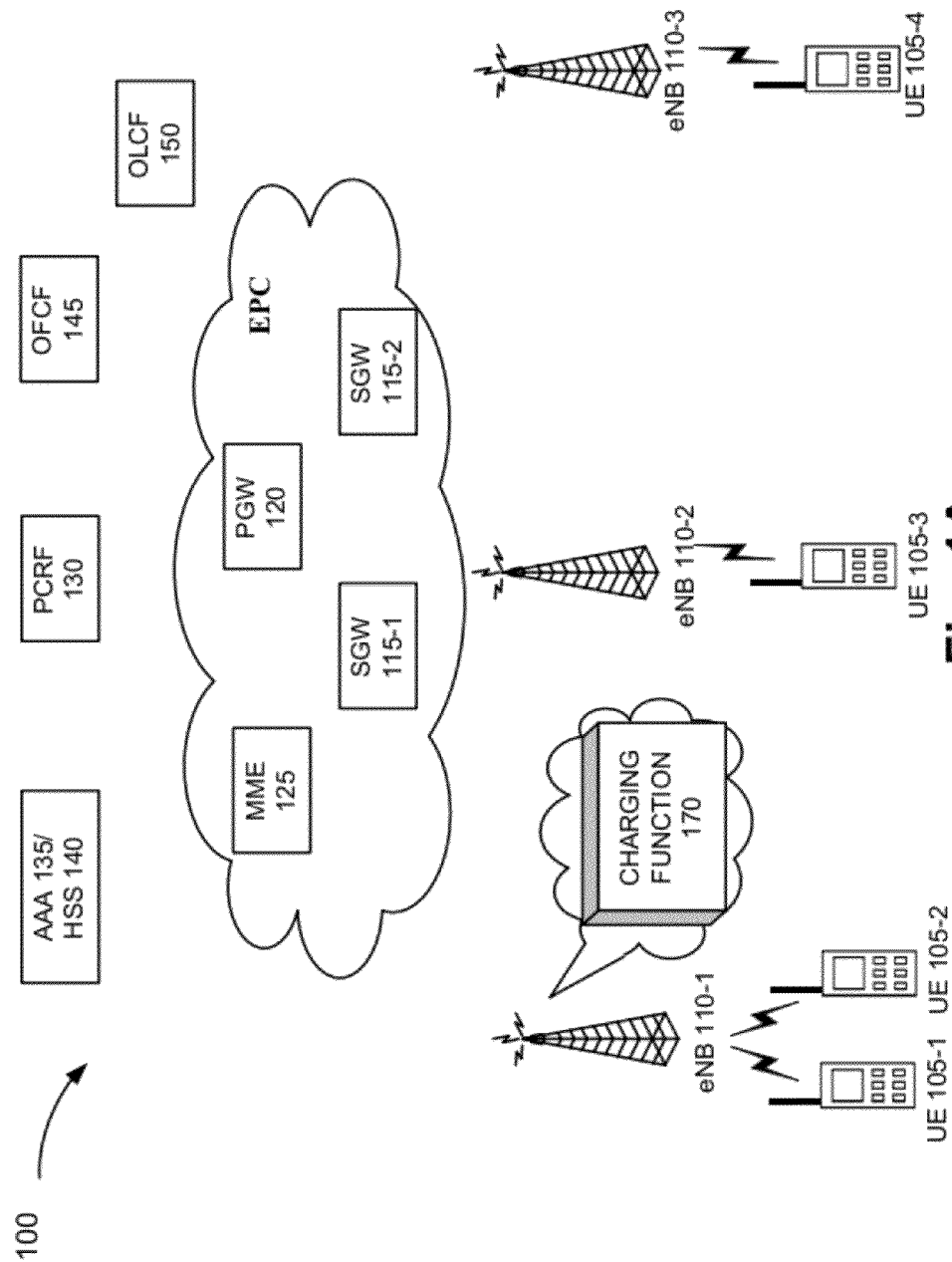

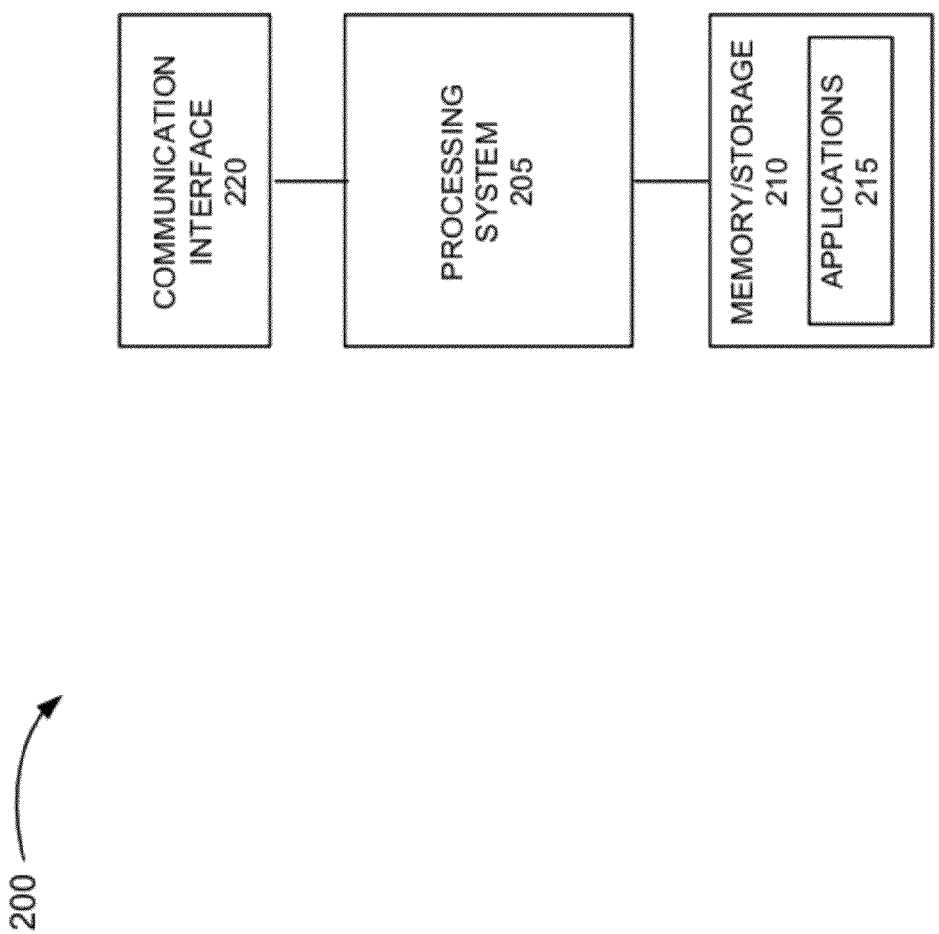

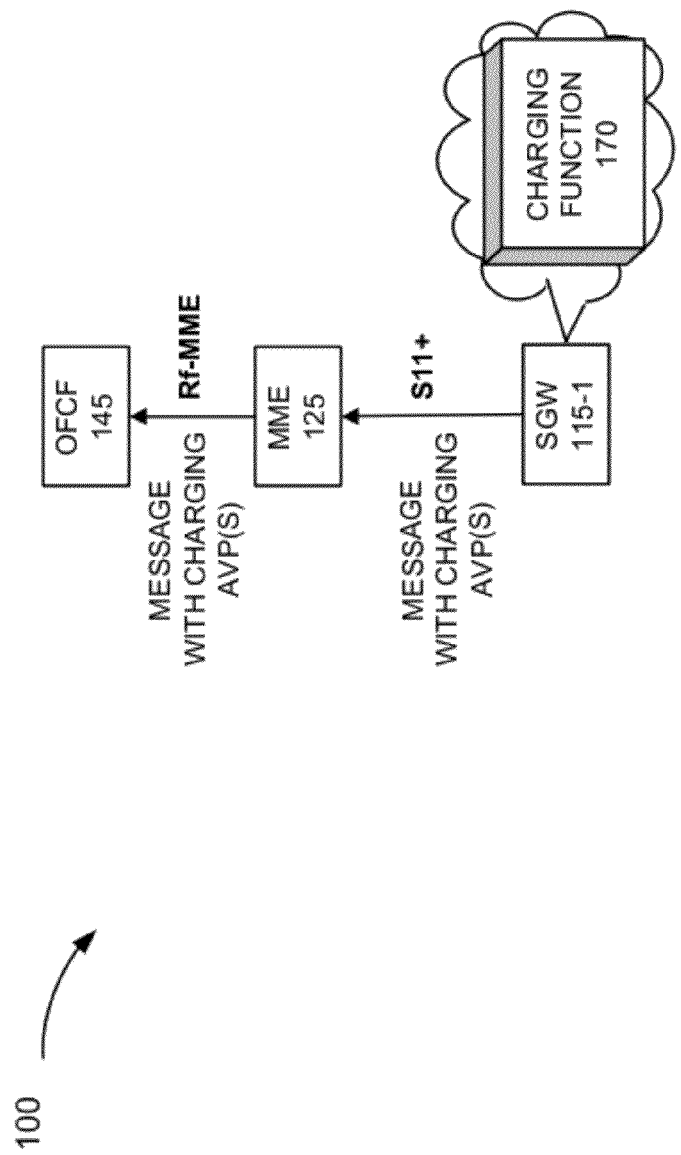

CHARGING FOR DATA OFFLOADING

BACKGROUND

As network operators and service providers strive to provide new or improved services and/or assets to users, network demands may correspondingly increase. As a result, network operators and service providers must confront a host of challenges to ensure that quality of service (QOS) and other performance metrics are maintained.

BRIEF DESCRIPTION OF THE DRAWINGS

FIG. 1A is a diagram illustrating an exemplary network in which charging may be implemented with respect to data offloading;

FIG. 2 is a diagram illustrating exemplary components of a device that may correspond to one or more of the devices in the exemplary network;

FIGS. 5A-5D are diagrams illustrating exemplary embodiments in which charging information may be provided to an off-line charging function;

DETAILED DESCRIPTION OF PREFERRED EMBODIMENTS

Figure 1B:
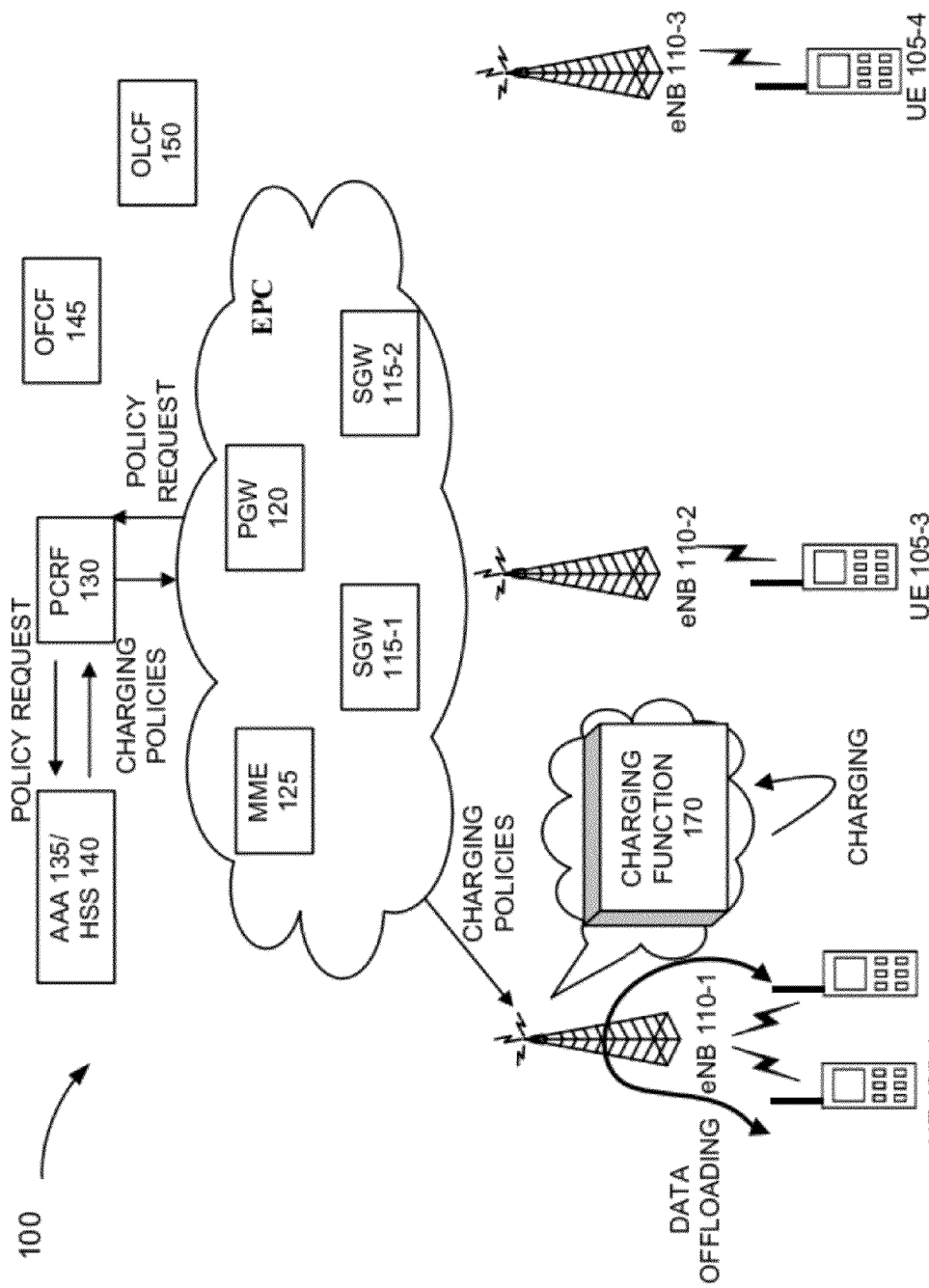
FIG. 1B is a diagram illustrating an exemplary process in which charging policies are provided to a wireless node that performs data offloading.

The following detailed description refers to the accompanying drawings. The same reference numbers in different drawings may identify the same or similar elements. Also, the following detailed description does not limit the invention.

The term "wireless node," is intended to be broadly interpreted to include a device that wirelessly communicates with a user device (e.g., user equipment (UE)). By way of example, a wireless node may correspond to an evolved Node B (eNB), a base station (BS), a base station controller (BSC), a Node B, a base transceiver station (BTS), a relay node, a repeater, a home eNB (HeNB), a home node B (HNB), a radio node, or a UE-gateway (UE-GW). The wireless node may support one access and/or wireless technology or multiple access and/or wireless technologies.

The term "data offloading," as used herein, is to be broadly interpreted to include providing user device-to-user device data flow (e.g., not including signaling flow) between users as locally as possible toward the users. Examples of "data offloading" are further described in co-pending patent application Ser. Nos. 12/692,232, 12/695,208, and 12/842,310," which are incorporated by reference herein in their entirety. Data offloading may be applied per user per application or per data flow per user. A data flow may correspond to, for example, a peer-to-peer application or a mobile-to-mobile flow. Data offloading may be applied within a same operator network or between different operator networks.

By way of example, within a Long Term Evolution (LTE) network, data offloading may permit a data flow to traverse one or more wireless nodes (e.g., one or more eNBs) to which user devices may be attached without traversing higher layers of the LTE network (e.g., a serving gateway (SGW), a packet data network (PDN) gateway (PGW)). However, data offloading may be applicable to networks other than the LTE network. In this regard, the term "network," as used herein, is intended to be broadly interpreted to include a wireless network (e.g., mobile network, cellular network, non-cellular network, etc.). By way of example, data offloading may be performed in a variety of network types, such as, a Global System for Mobile Communications (GSM) network, a Universal Mobile Telecommunication System (UMTS) network, a Wideband Code Division Multiple Access (WCDMA) network, an Ultra Mobile Broadband (UMB) network, a High-Speed Packet Access (HSPA) network, a Worldwide Interoperability for Microwave Access (WiMAX) network, an Institute of Electrical and Electronics Engineers (IEEE) 802.X network, a Evolution Data Optimized (EV-DO) network, and/or another type of wireless network (e.g., an ad hoc network, etc.), or some other type of wired network.

According to exemplary embodiments, a wireless node may perform charging in relation to data offloading. According to an exemplary implementation, the wireless node may receive charging policies that define how charging is carried out when data offloading is performed. The charging policies may include, for example, on-line charging policies and off-line charging policies.

According to an exemplary embodiment, the wireless node may include a charging function (CF). The CF may perform charging (e.g., charging collection, charging record generation, etc.), as described further below, in relation to the data offloading being performed.

Typically, user device-to-user device flows traverse higher layers of a network relative to the wireless node. For example, in an LTE network, charging may be performed at the PGW. However, according to exemplary embodiments, and in contrast to the LTE standard, the wireless node (e.g., the eNB, the SGW, etc.) may perform charging. Similarly, in contrast to other network standards (e.g., GSM standards, etc.), according to exemplary embodiments, a wireless node may perform charging.

FIG. 1A is a diagram illustrating an exemplary network 100 in which charging may be implemented with respect to data offloading. As illustrated in FIG. 1A, exemplary network 100 may include eNBs 110-1 through 110-3 (referred to generally as eNB 110 or eNBs 110), SGWs 115-1 through 115-2 (referred to generally as SGW 115 or SGWs 115), PGW 120, mobility management entity (MME) 125, policy and charging rules function (PCRF) device 130, authentication, authorization, and accounting (AAA) server 135/home subscriber server (HSS) 140 (AAA 135/HSS 140), off-line charging function (OFCF) 145, and on-line charging system (OLCF) 150. According to an exemplary implementation of the LTE communication standard, SGW 115, PGW 120, and MME 125 may form an Evolved Packet Core (EPC) network. UEs 105-1 through 105-4 (referred to generally as UE 105 or UEs 105) may attach to network 100 for services, assets, etc.

The number of devices and configuration in network 100 is exemplary and provided for simplicity. In practice, network 100 may include more devices, fewer devices, different devices, and/or differently arranged devices than those illustrated in FIG. 1A. For example, network 100 may include another type of gateway, a relay node, a (HeNB), a femtocell, a picocell, a repeater, a radio node, a UE-GW, etc. Additionally, or alternatively, network 100 may include additional networks and/or different networks than those illustrated in FIG. 1A. For example, network 100 may include public and/or private Internet Protocol (IP) networks and/or other types of networks, resources, assets, services, Application Service Providers (ASPs), other operators that may host applications, etc. Also, some functions described as being performed by a particular device (e.g., a wireless node, etc.) may be performed by a different device or a combination of devices. Additionally, or alternatively, although FIG. 1A illustrates separate instances of MME 125, PGW 120, SGW 115, etc., in other implementations, two or more of these devices may be combined. For example, MME 125 may be combined with SGW 115, or PGW 120 may be combined with SGW 115, PCRF 130 may be combined with PGW 120, OFCF 145 may be combined with OLCF 150, etc. Network 100 may include wired and/or wireless connections among the devices illustrated.

UE 105 may include a device having the capability to communicate with other devices, systems, networks, and/or the like. For example, UE 105 may include a wireless telephone, an IP telephone, a computer (e.g., a laptop, a palmtop, etc.), a personal digital assistant (PDA), a gaming device, a personal communication system (PCS) terminal, a pervasive computing device, a video playing device, a music playing device, a kiosk, and/or some other type of portable device, mobile device, handheld device, stationary device, user device, and/or vehicle-based device. According to an exemplary implementation, UE 105 may operate according to one or more versions of the LTE communication standard. According to other implementations, UE 105 may operate according to one or more other wireless and/or wired network standards.

ENB 110 may include a network device that operates according to one or more versions of the LTE communication standard. Additionally, according to other exemplary implementations, eNB 110 may operate according to access technologies (e.g., radio access technologies, etc.) other than an LTE communication standard.

According to an exemplary embodiment, eNB 110 may include a charging function (CF) 170. As described further below, CF 170 may receive charging policies and may generate on-line and/or off-line charging information in relation to data offloading. Additionally, as described further below, according to an exemplary embodiment, eNB 110 may include new and/or modified interfaces to communicate with other devices in relation to data offloaded charging. Additionally, eNB 110 may use new and/or modified messaging to communicate with other devices in relation to data offloaded charging.

SGW 115 may include a network device that operates according to one or more versions of the LTE communication standard. Additionally, according to other exemplary implementations, SGW 115 may operate according to a communication standard other than an LTE communication standard. Since data offloading may be performed at SGW 115, although not illustrated, according to an exemplary embodiment, SGW 115 may include CF 170. Additionally, as described further below, according to an exemplary embodiment, SGW 115 may include new and/or modified interfaces to communicate with other devices in relation to data offloaded charging. Additionally, SGW 115 may use new and/or modified messaging to communicate with other devices in relation to data offloaded charging.

PGW 120 and MME 125 may include network devices that operate according to one or more versions of the LTE communication standard. Additionally, according to other exemplary implementations, PGW 120 and MME 125 may operate according to a communication standard other than an LTE communication standard. Additionally, as described below, according to an exemplary embodiment, PGW 120 and MME 125 may include new and/or modified interfaces to communicate with other devices in relation to data offloaded charging. Additionally, PGW 120 and MME 125 may use new and/or modified messaging to communicate with other devices in relation to data offloaded charging.

PCRF 130 may include a network device that manages bandwidth, charging rates, and policies. AAA server 135 may include a network device that provides authentication, authorization, and accounting services. HSS 140 may include a network device that provides subscriber data storage for subscription-related information (e.g., subscriber profiles, etc.). HSS 140 may also provide other services (e.g., authentication, authorization, etc.). According to an exemplary embodiment, AAA 135/HSS 140 may store application/service policies and charging policies. Additionally, as described further below, according an exemplary embodiment, PCRF 130 and AAA 135/HSS 140 may include new and/or modified interfaces to communicate with other devices in relation to data offloaded charging. Additionally, PCRF 130 and AAA 135/HSS 140 may use new and/or modified messaging to communicate with other devices in relation to data offloaded charging.

OFCF 145 may include a network device that acquires, processes, and distributes charging information in relation to off-line charging. For example, offline charging may provide that users pay for services after the services are rendered. OFCF 145 may include new and/or modified interfaces to communicate with other devices in relation to data offloaded charging. OFCF 145 may use new and/or modified messaging to communicate with other devices in relation to data offloaded charging. OLCF 150 may include a network device that acquires, processes, and distributes charging information in relation to on-line charging. For example, online charging may provide that users pay for services based on a credit-based charging (e.g., prepaid) and/or a real-time credit control charging. OLCF 150 may include new and/or modified interfaces to communicate with other devices in relation to data offloaded charging. OLCF 150 may use new and/or modified messaging to communicate with other devices in relation to data offloaded charging.

Figure 1C:
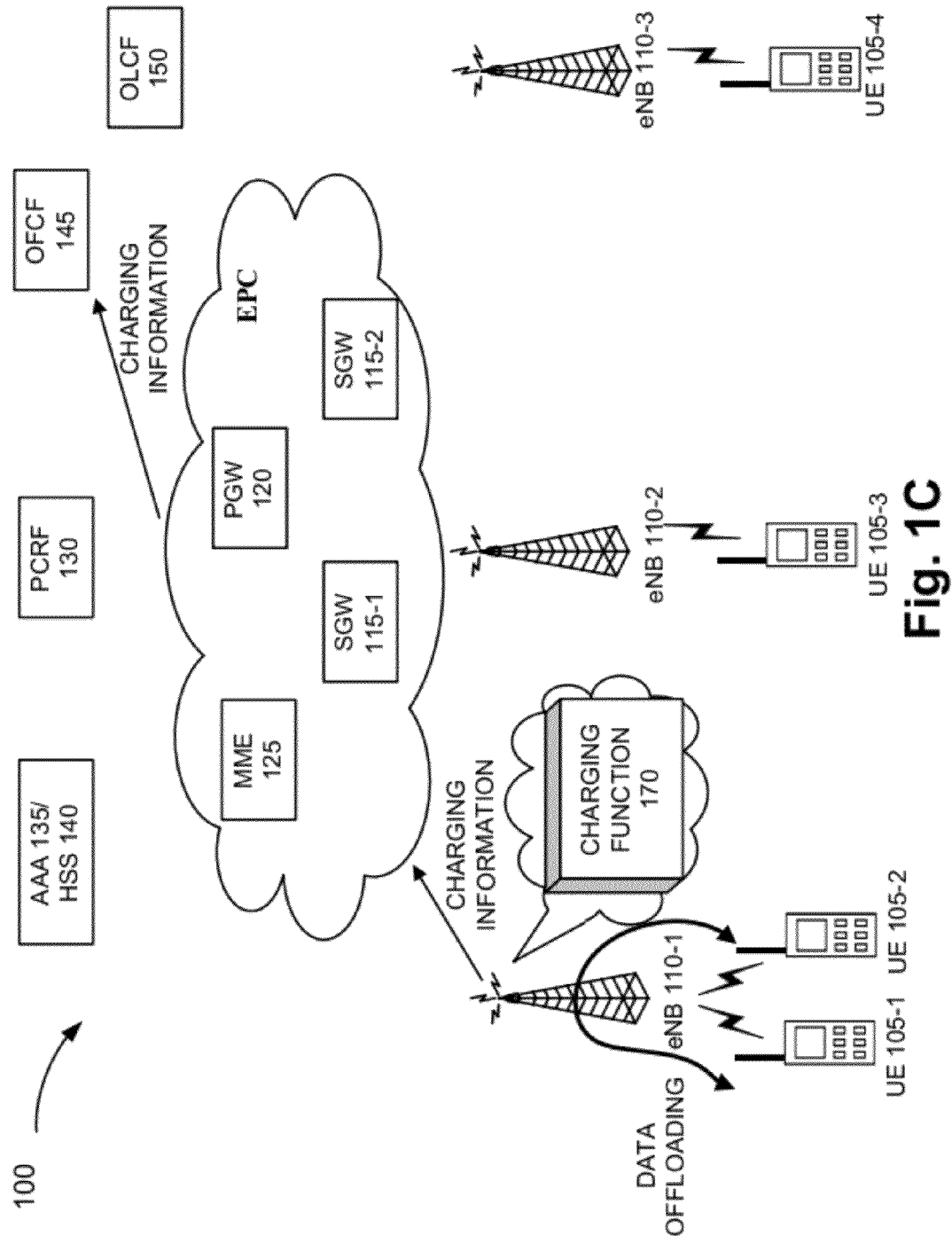
FIG. 1C is a diagram illustrating an exemplary process in which charging information may be provided to an off-line charging function.
Figure 1D:
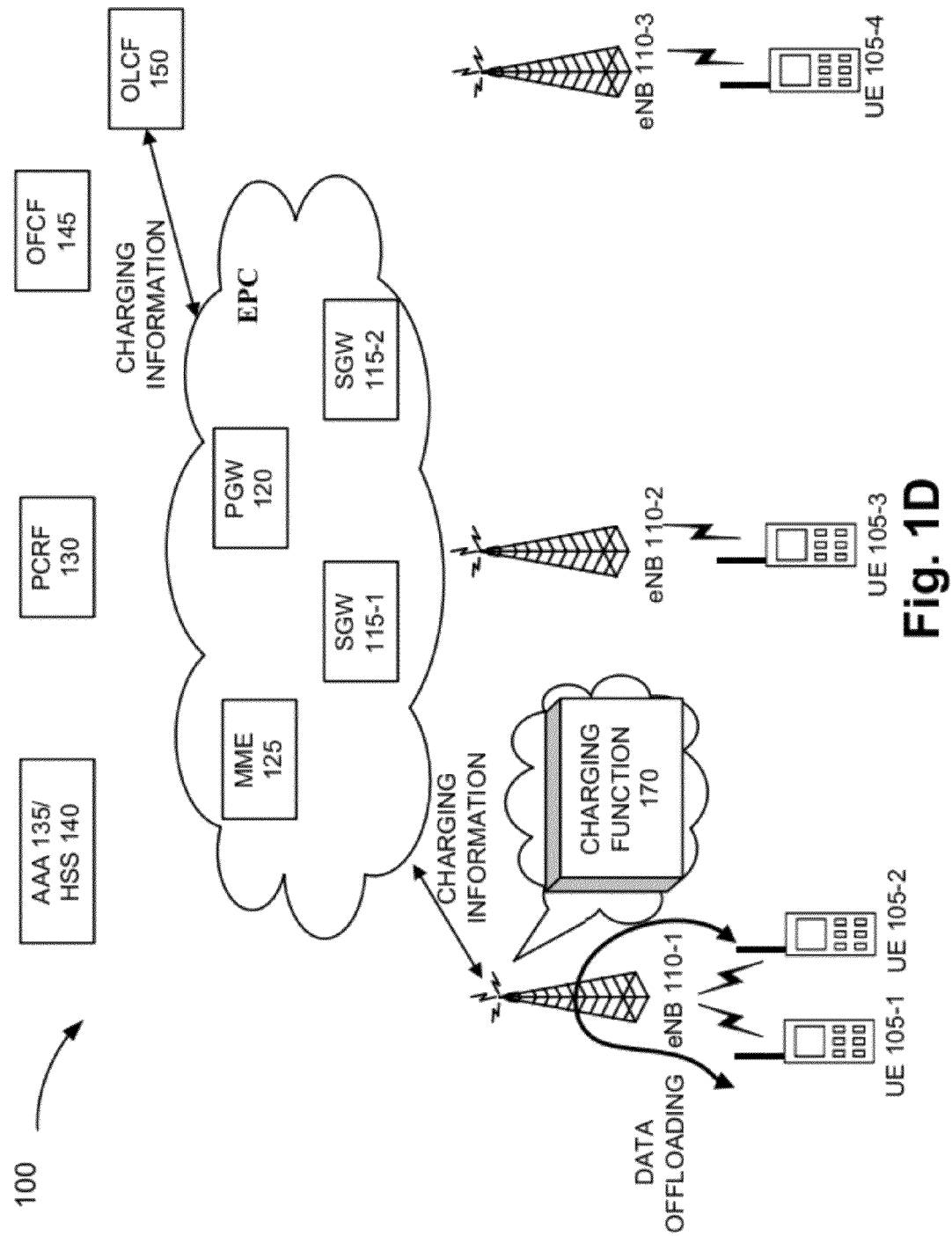
FIG. 1D is a diagram illustrating an exemplary process in which charging information may be provided to an on-line charging function.

FIGS. 1B-1D are diagrams illustrating exemplary processes in which data offloaded charging may be implemented.

In this example, the wireless node may correspond to eNB 110-1. According to other implementations, the wireless node may be a different device.

Referring to FIG. 1B, according to an exemplary process, it may be assumed that UEs 105-1 and 105-2 attached to network 100 using a normal call flow for an LTE network. As illustrated, PGW 120 may send a policy request to PCRF 130. In turn, PCRF 130 may send a policy request to AAA 135/HSS 140. AAA 135/HSS 140 may send a policy response that includes charging policies for data offloading. As illustrated, according to an exemplary implementation, the charging policies may be sent to eNB 110-1 via PCRF 130 and the EPC network. CF 170 of eNB 110-1 may use the charging policies when data offloading is performed to generate charging information.

Referring to FIG. 1C, according to an exemplary process, CF 170 of eNB 110-1 may provide charging information to OFCF 145. As illustrated, according to an exemplary implementation, the charging information may be sent to OFCF 145 via the EPC network. Referring to FIG. 1D, according to an exemplary process, CF 170 of eNB 110-1 may provide the charging information to OLCF 150. As illustrated, according to an exemplary implementation, the charging information may be sent to OLCF 150 via the EPC network.

As previously described, according to other embodiments, the wireless node may correspond to SGW 115, or other devices (e.g., a HeNB, a UE-GW, etc.) not illustrated in FIGS. 1A-1D. According to such other embodiments, the wireless node may be provided with charging policies. Further, the wireless node may provide charging information to OFCF 145 or OLCF 150.

Since an exemplary embodiment has been broadly described, a more detailed description is provided below.

FIG. 2 is a diagram illustrating exemplary components of a device 200 that may correspond to one or more of the devices in network 100. For example, device 200 may correspond to PGW 120, SGW 115, eNB 110, as well as other devices (e.g., MME 125, OFCF 145, OLCF 150, UE 105, etc.), depicted in FIGS. 1A-1D. As illustrated, device 200 may include a processing system 205, memory/storage 210 including applications 215, and a communication interface 220. According to other implementations, device 200 may include fewer components, additional components, different components, and/or a different arrangement of components than those illustrated in FIG. 2 and described herein.

Processing system 205 may include one or more processors, microprocessors, data processors, co-processors, application specific integrated circuits (ASICs), controllers, programmable logic devices, chipsets, field programmable gate arrays (FPGAs), or some other component that may interpret and/or execute instructions and/or data. Processing system 205 may control the overall operation or a portion of operation(s) performable by device 200. Processing system 205 may perform one or more operations based on an operating system and/or various applications (e.g., applications 215).

Memory/storage 210 may include one or more memories and/or one or more secondary storages. For example, memory/storage 210 may include a random access memory (RAM), a dynamic random access memory (DRAM), a read only memory (ROM), a programmable read only memory (PROM), a flash memory, and/or some other type of memory. Memory/storage 210 may include a hard disk (e.g., a magnetic disk, an optical disk, a magneto-optic disk, a solid state disk, etc.) or some other type of computer-readable medium, along with a corresponding drive. Memory/storage 210 may include a memory, a storage device, or storage component that is external to and/or removable from device 200, such as, for example, a Universal Serial Bus (USB) memory stick, a hard disk, mass storage, off-line storage, etc.

The term "computer-readable medium," as used herein, is intended to be broadly interpreted to include, for example, a memory, a secondary storage, a compact disc (CD), a digital versatile disc (DVD), or the like. The computer-readable medium may be implemented in a single device, in multiple devices, in a centralized manner, or in a distributed manner. Memory/storage 210 may store data, application(s), and/or instructions related to the operation of device 200.

Applications 215 may include software that provides various services or functions. For example, applications 215 may include an application for charging in relation to data offloading.

Communication interface 220 may permit device 200 to communicate with other devices, networks, systems and/or the like. Communication interface 220 may include a wireless interface and/or wired interface. Communication interface 220 may include a transmitter, a receiver, and/or a transceiver. Communication interface 220 may include interfaces according to LTE communication standards. For example, as described further below, communication interface 220 may include new interfaces or modified interfaces with respect to the LTE standard. Alternatively, communication interface 220 may include new interfaces and/or modified interfaces with respect to communication standards other than LTE.

Device 200 may perform operations in response to processing system 205 executing software instructions contained in a computer-readable medium, such as memory/storage 210. For example, the software instructions may be read into memory/storage 210 from another computer-readable medium or from another device via communication interface 220. The software instructions contained in memory/storage 210 may cause processing system 205 to perform processes described herein. Alternatively, device 200 may perform processes based on hardware, hardware and firmware, or hardware, software and firmware.

Figure 3:
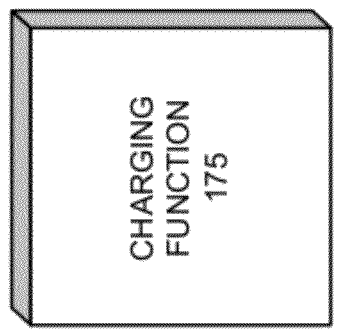
FIG. 3 is a diagram illustrating an exemplary functional component associated with an exemplary implementation of a wireless node.

As previously described, a wireless node may perform charging in relation to data offloading. FIG. 3 is a diagram illustrating an exemplary functional component associated with an exemplary implementation of a wireless node. As illustrated, the wireless node may include a CF 170. CF 170 may be implemented as a combination of hardware (e.g., processing system 205, etc.) and software (e.g. applications 215, etc.) based on the components described with respect to FIG. 2. Alternatively, CF 170 may be implemented as hardware and firmware, or hardware, software and firmware.

CF 170 may generate off-line charging information and/or on-line charging information based on charging policies and/or information associated with the network, users, type of application flow, quality of service (QoS), etc. According to an exemplary implementation, the charging information may include information to allow OFCF 145 and OLCF 150 to generate charging records. According to another exemplary implementation, the charging information may correspond to charging records. For example, CF 170 may generate charging records and provide the charging records to OFCF 145. CF 170 may generate charging information based on charging triggering functions associated with data offloading.

Although FIG. 3 illustrates exemplary functional components of the wireless node, according to other implementations, the wireless node may include additional functional components, different functional components, and/or a different arrangement of functional components than those illustrated in FIG. 3 and described.

As previously described, the charging policies may be provided to a wireless node to permit the wireless node to provide charging in relation to data offloading. Described below are exemplary embodiments in which the charging policies may be provided to eNB 110 or SGW 115 of network 100. According to an exemplary implementation, the charging policies may be provided using one or more messages that include one or more policy attribute value pairs (AVPs).

Figure 4A:
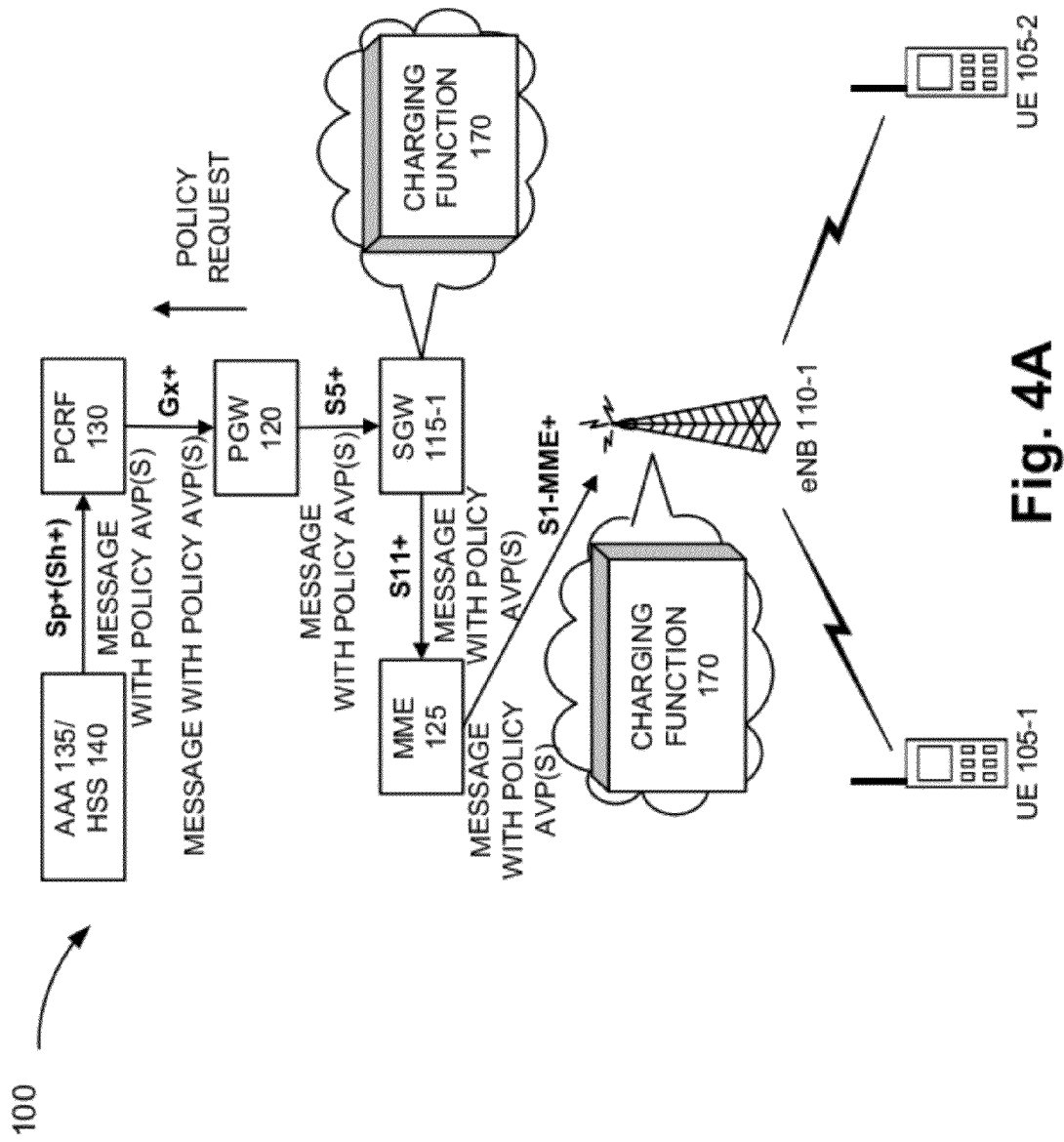
FIG. 4A is a diagram illustrating an exemplary embodiment in which the charging policies may be provided to an eNB and/or an SGW.

FIG. 4A is a diagram illustrating an exemplary embodiment in which the charging policies may be provided to SGW 115-1 and eNB 110-1. According to an exemplary implementation, PGW 120 may send a policy request to PCRF 130 (e.g., after UEs 105 have attached to network 100). The policy request may be sent over a modified Gx interface (Gx+ interface). PCRF 130 may receive the policy request and obtain the policies from AAA 135/HSS 140 over a modified Sp interface (Sp+ interface) or a modified Sh interface (Sh+ interface). For example, AAA 135/HSS 140 may send a message with policy AVP(s) to PCRF 130. According to another implementation, although not illustrated, PCRF 130 may receive the policy request and obtain the policies from AAA 135/HSS 140 over a modified Ud interface based on the Lightweight Directory Access Protocol (LDAP). PCRF 130 may send the charging policies to PGW 120 over the Gx+ interface using a message with policy AVP(s). As further illustrated, PGW 120 may send a message with policy AVP(s) to SGW 115-1 over a modified S5 interface (S5+ interface); SGW 115-1 may send a message with policy AVP(s) to MME 125 over a modified S11 interface (S11+ interface); and MME 125 may send a message with policy AVP(s) to eNB 110-1 over a modified S1-MME interface (S1-MME+ interface).

Figure 4B:
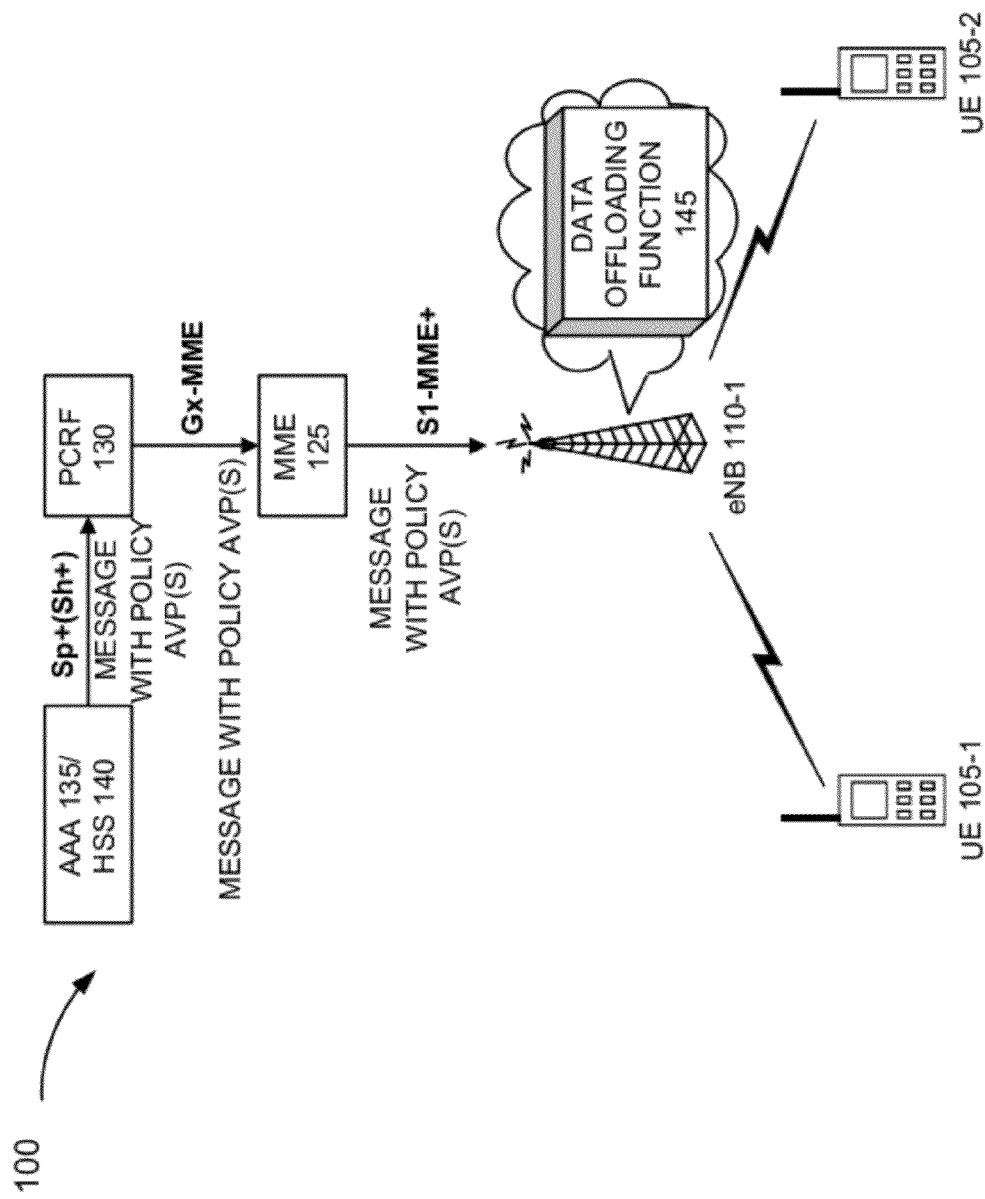
FIG. 4B is a diagram illustrating an exemplary embodiment in which the charging policies may be provided to an eNB.

According to another exemplary embodiment, the charging policies may be provided to the wireless node along a path different than the path illustrated and described with respect to FIG. 4A. For example, FIG. 4B is a diagram illustrating an exemplary embodiment in which the charging policies may be provided to eNB 110-1. According to an exemplary implementation, AAA 135/HSS 140 may send the charging policies in a message with policy AVP(s) to PCRF 130 over the Sp+ interface or the Sh+ interface. According to another implementation, although not illustrated, AAA 135/HSS 140 may send the charging policies in a message with policy AVP(s) to PCRF 130 over a modified Ud interface. PCRF 130 may send the charging policies in a message with policy AVP(s) to MME 125 over a new Gx interface (Gx-MME interface). In turn, MME 125 may send the charging policies in a message with policy AVP(s) to eNB 110-1 over the S1-MME+ interface.

Figure 4C:
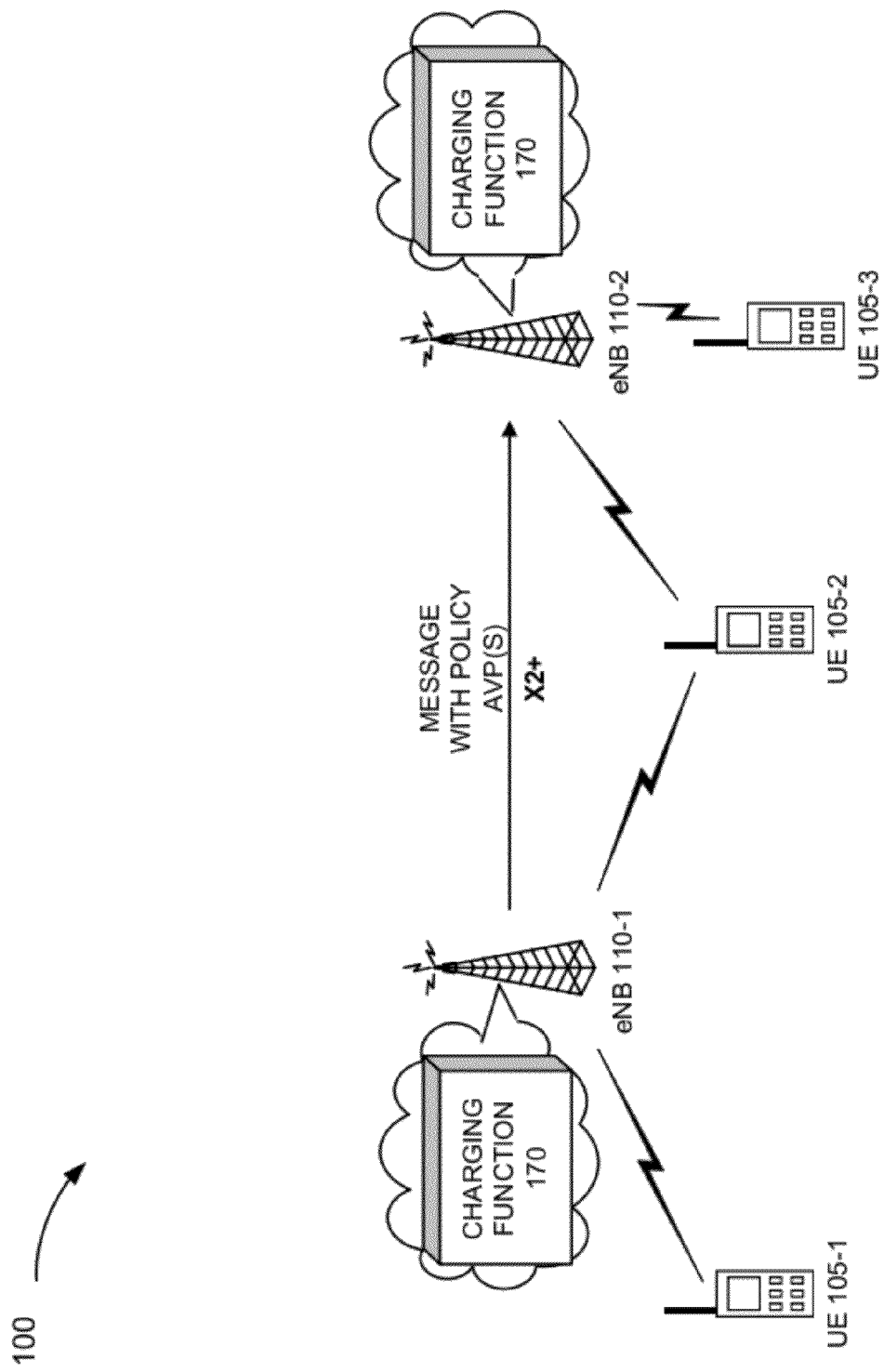
FIG. 4C is a diagram illustrating an exemplary embodiment in which the charging policies may be provided between eNBs.

According to another exemplary embodiment, wireless nodes may provide charging policies to other wireless nodes during a handover or when data offloading involves two or more wireless nodes performing data offloading. For example, an eNB 110 may provide charging policies to another eNB 110 during a handover or when data offloading is being performed between eNBs 110. FIG. 4C is a diagram illustrating an exemplary embodiment in which charging policies may be provided from one wireless node to another wireless node. As illustrated, during a handover associated with UE 105-2, eNB 110-1 may send charging policies in a message with policy AVP(s) to eNB 110-2. According to another implementation, when data offloading is being performed between eNB 110-1 and eNB 110-2 (e.g., without a handover, such as between UE 105-1 and UE 105-3), eNB 110-1 may send charging policies in a message with policy AVP(s) to eNB 110-2. As illustrated in FIG. 4C, eNB 110-1 may send the charging policies in the message with policy AVP(s) over a modified X2 interface (X2+ interface).

Figure 4D:
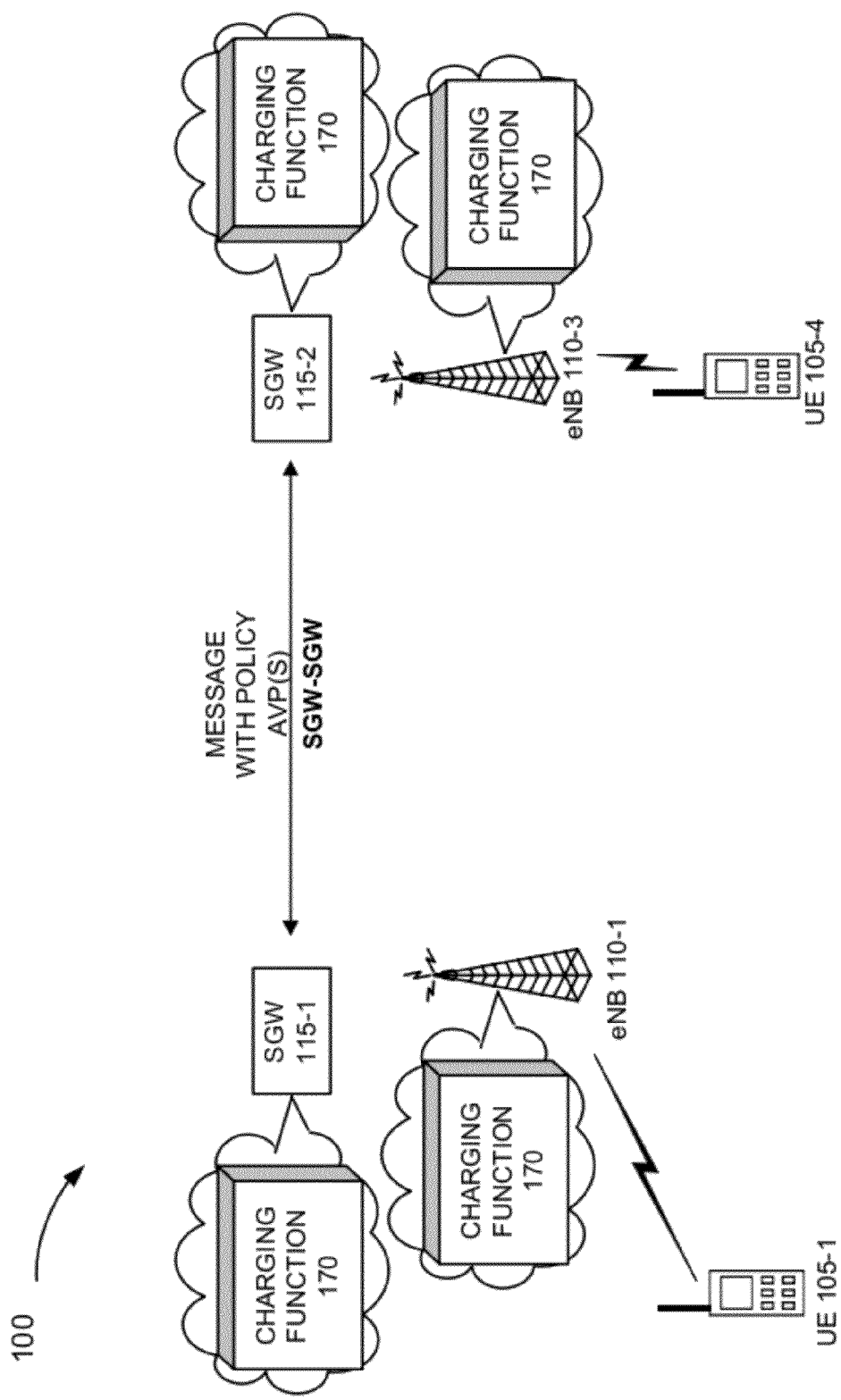
FIG. 4D is a diagram illustrating an exemplary embodiment in which the charging policies may be provided between SGWs.

According to another example, the wireless nodes may correspond to SGWs 115. FIG. 4D is a diagram illustrating an exemplary embodiment in which charging policies may be provided from one wireless node to another wireless node. As illustrated, when data offloading involves UEs 105 (e.g., US 105-1 and UE 105-4) attached to different SGWs 115 (e.g., SGW 115-1 and SGW 115-2), SGW 115-1 may send charging policies in a message with policy AVP(s) to SGW 115-2 over a new interface (SGW-SGW interface). According to another example, although not illustrated, SGW 115-1 may send charging policies to SGW 115-2 during a handover process.

The wireless node may generate charging information based on the charging policies and/or other information. According to an exemplary implementation, the wireless node may provide the generated charging information to an online charging system and/or an offline charging system. Described below are examples in which the charging information may be provided to OFCF 145 and OLCF 150.

FIGS. 5A-5D are diagrams illustrating exemplary embodiments in which charging information may be provided to OFCF 145. FIGS. 5E-5H are diagrams illustrating exemplary embodiments in which charging information may be provided to OLCF 150. According to an exemplary implementation, the charging information may be provided to OFCF 145 or OLCF 150 using one or more messages that include one or more charging AVPs.

Figure 5A:
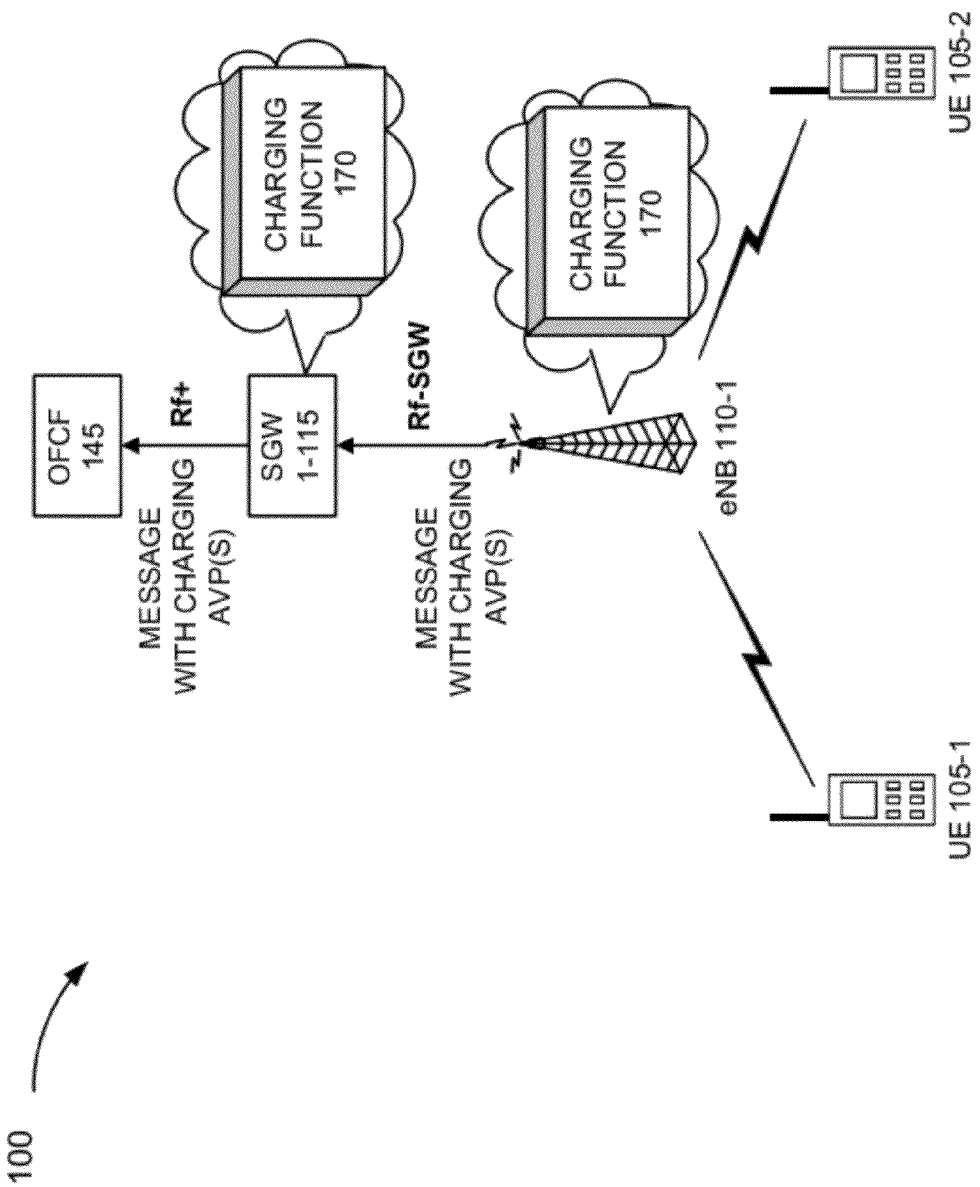

Referring to FIG. 5A, eNB 110-1 may send a message with charging AVP(s) to SGW 115-1 over a new Rf-SGW interface. SGW 115-1 may send a message with charging AVP(s) to OFCF 145 over a modified Rf interface (Rf+). When data offloading is performed at SGW 115-1, SGW 115-1 may send a message with charging AVP(s) to OFCF 145 over a modified Rf interface (Rf+).

Figure 5B:
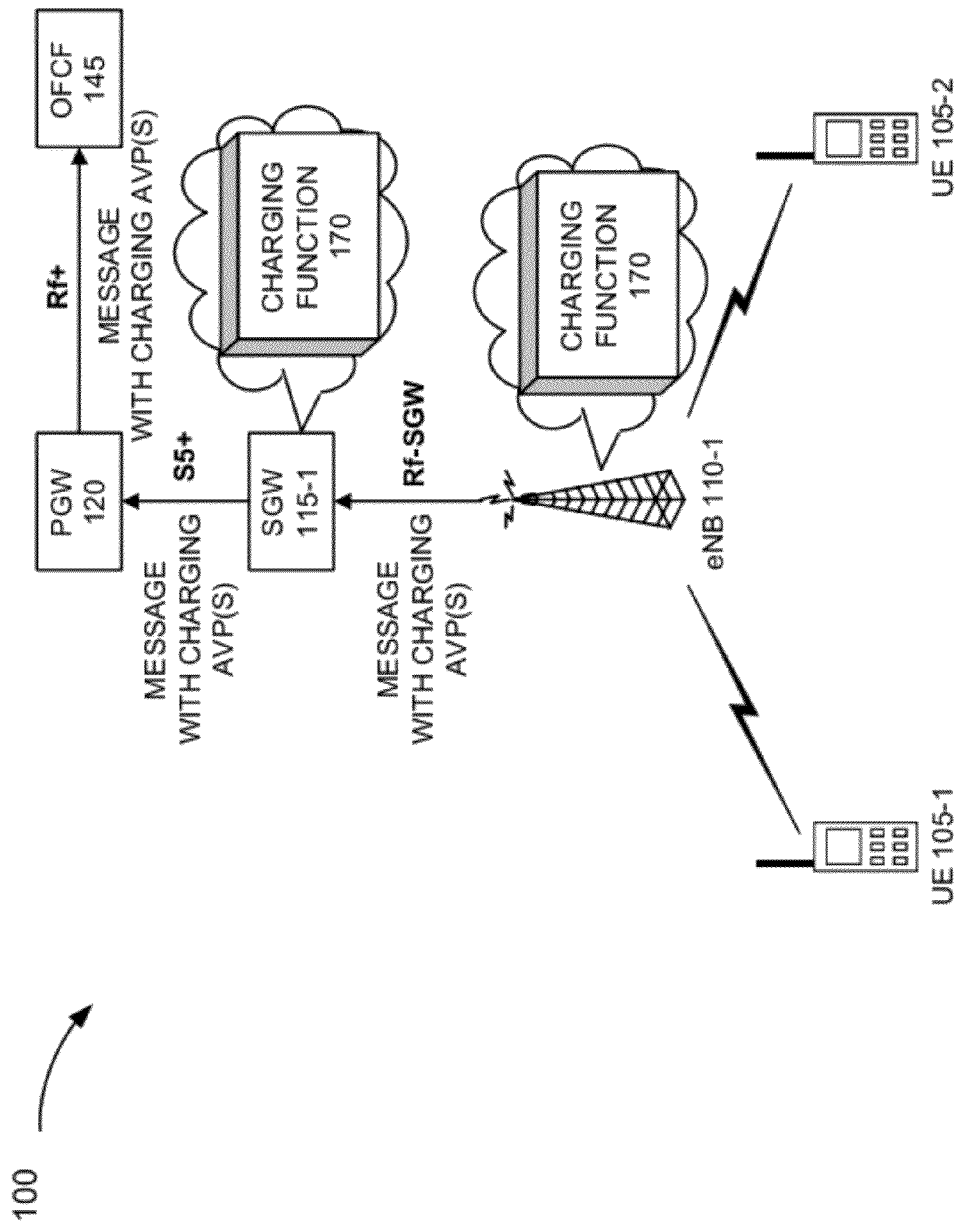

According to another implementation, the charging information may be sent to OFCF 145 via PGW 120. For example, as illustrated in FIG. 5B, eNB 110-1 may send a message with charging AVP(s) to SGW 115-1 over a new Rf-SGW interface. SGW 115-1 may send a message with charging AVP(s) to PGW 120 over a modified S5 interface (S5+). In turn, PGW 120 may send a message with charging AVP(s) to OFCF 145 over a modified Rf interface (Rf+). When data offloading is performed at SGW 115-1, SGW 115-1 may send a message with charging AVP(s) to PGW 120 over the modified S5 interface (S5+) and PGW 120 may send a message with charging AVP(s) to OFCF 145 over the modified Rf interface (Rf+).

Figure 5C:
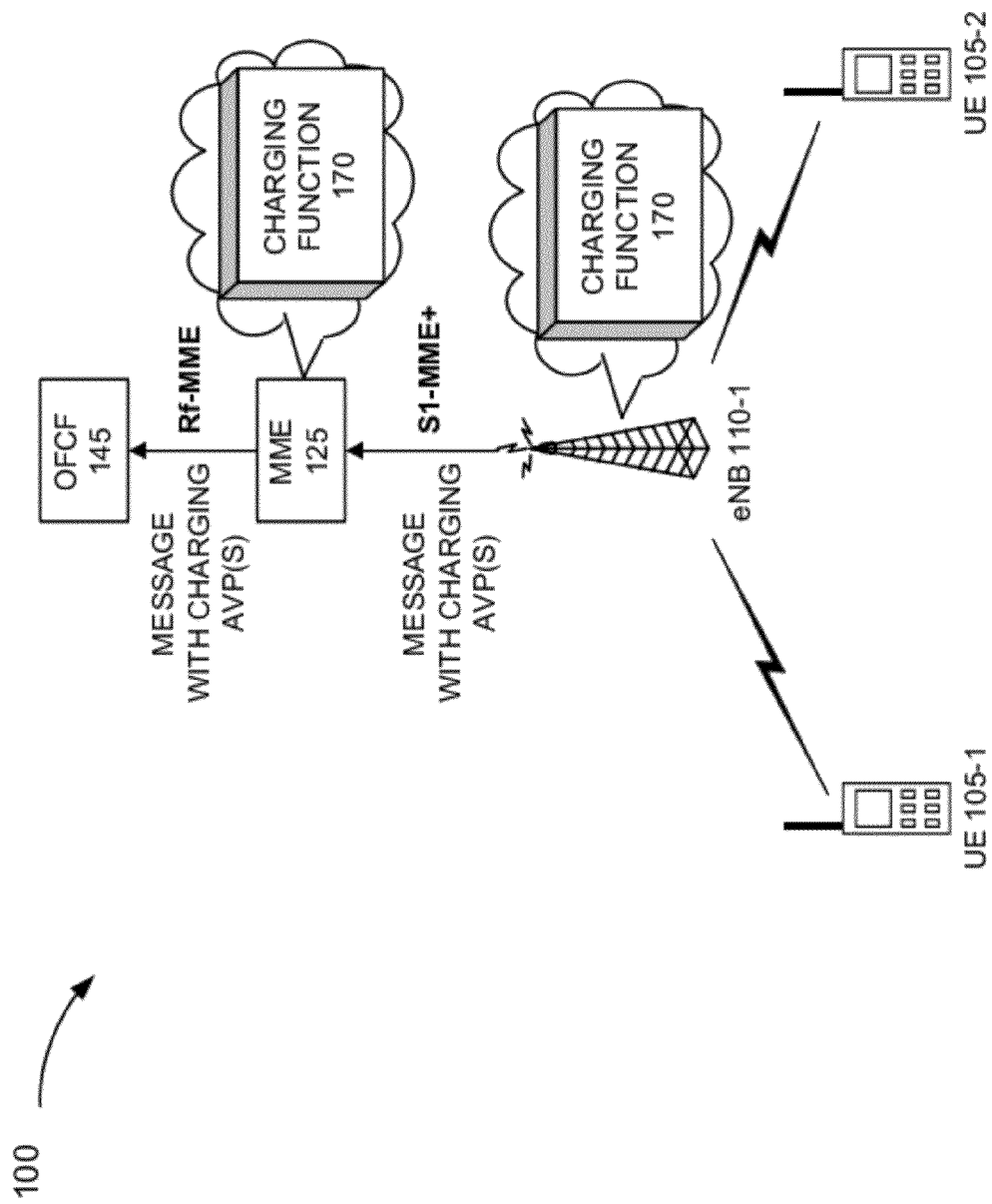

According to yet another implementation, the charging information may be sent to OFCF 145 via MME 125. For example, as illustrated in FIG. 5C, eNB 110-1 may a message with charging AVP(s) to MME 125 via a modified S1-MME interface (S1-MME+). In turn, MME 125 may send a message with charging AVP(s) to OFCF 145 over a new Rf-MME interface. According to still another implementation, as illustrated in FIG. 5D, when data offloading is performed at SGW 115-1, SGW 115-1 may send a message with charging AVP(s) to MME 125 over a modified S11 interface (S11+). In turn, MME 125 may send a message with charging AVP(s) to OFCF 145 over the new Rf-MME interface.

Figure 5E:
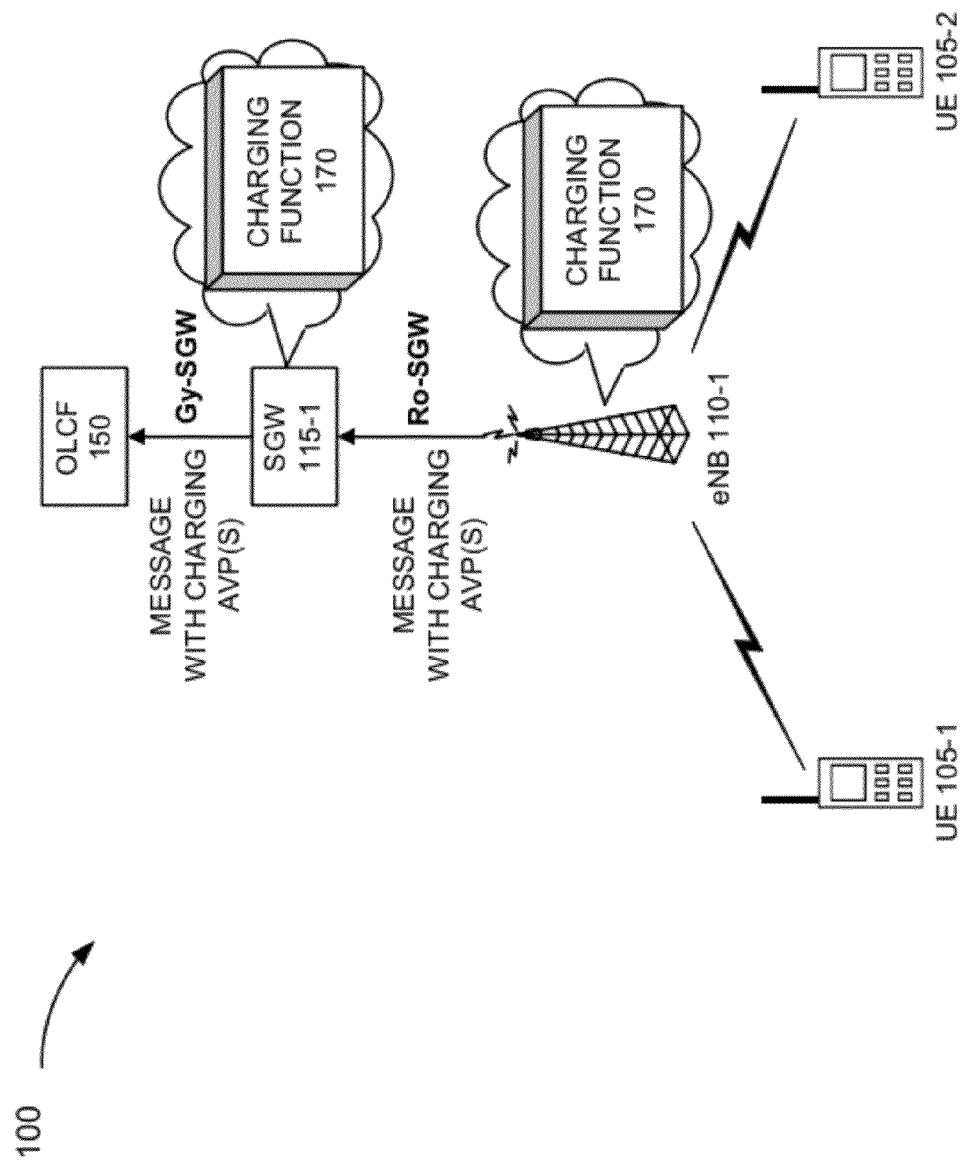
FIGS. 5E-5H are diagrams illustrating exemplary embodiments in which charging information may be provided to an on-line charging function.

Referring to FIGS. 5E-5H, the charging information may be provided to OLCF 150. For example, as illustrated in FIG. 5E, eNB 110-1 may send a message with charging AVP(s) to SGW 115-1 over a new Ro-SGW interface. SGW 115-1 may send a message with charging AVP(s) to OLCF 150 over a new Gy-SGW interface. When data offloading is performed at SGW 115-1, SGW 115-1 may send a message with charging AVP(s) to OLCF 150 over the new Gy-SGW interface.

Figure 5F:
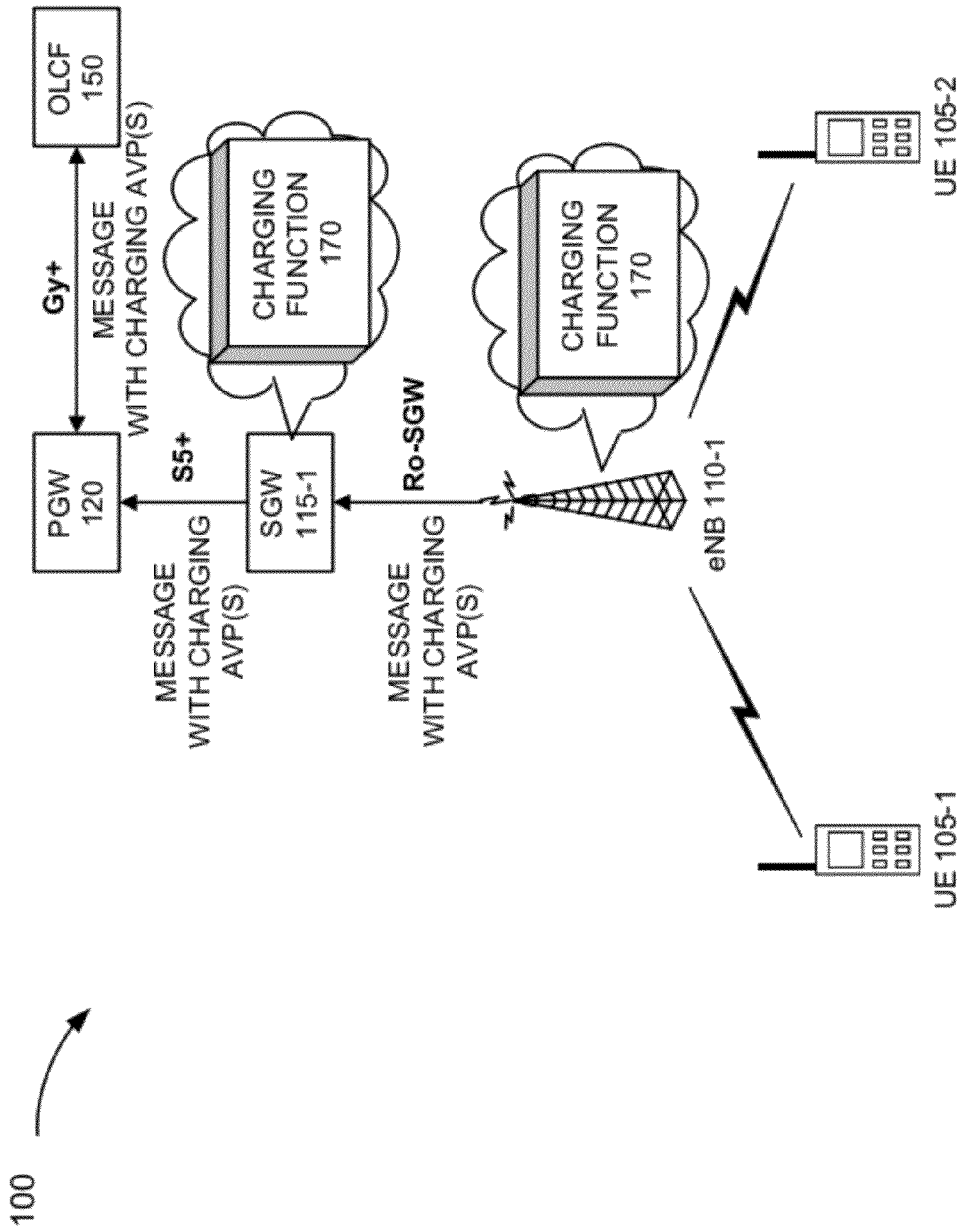

According to another implementation, the charging information may be sent to OLCF 150 via PGW 120. For example, as illustrated in FIG. 5F, eNB 110-1 may send a message with charging AVP(s) to SGW 115-1 over the new Ro-SGW interface. SGW 115-1 may send a message with charging AVP(s) to PGW 120 over a modified S5 interface (S5+). In turn, PGW 120 may send a message with charging AVP(s) to OLCF 150 over a modified Gy interface (Gy+). When data offloading is performed at SGW 115-1, SGW-1 may send a message with charging AVP(s) to PGW 120 over the modified S5 interface (S5+) and PGW 120 may send a message with charging AVP(s) to OLCF 150 over the modified Gy interface (Gy+).

Figure 5G:
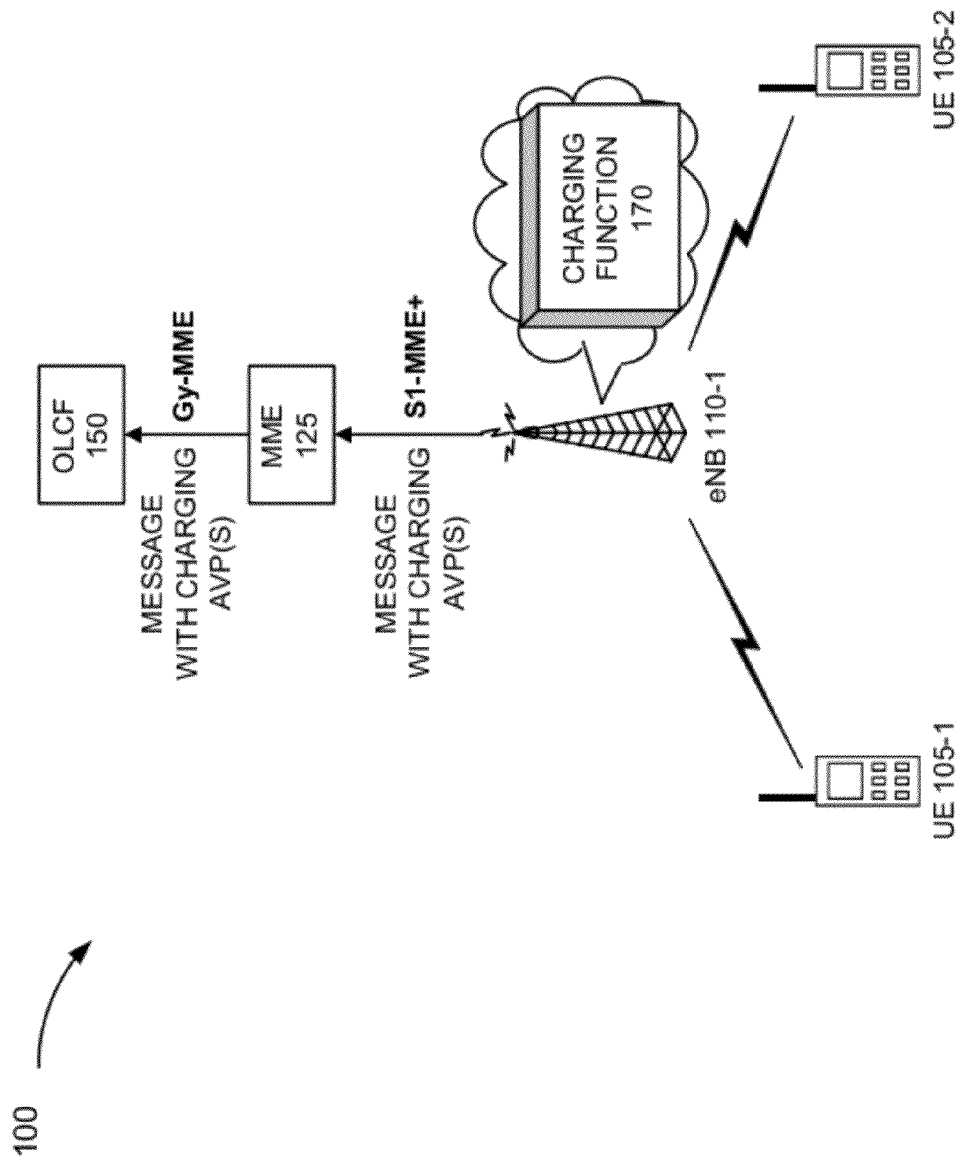
Figure 5H:
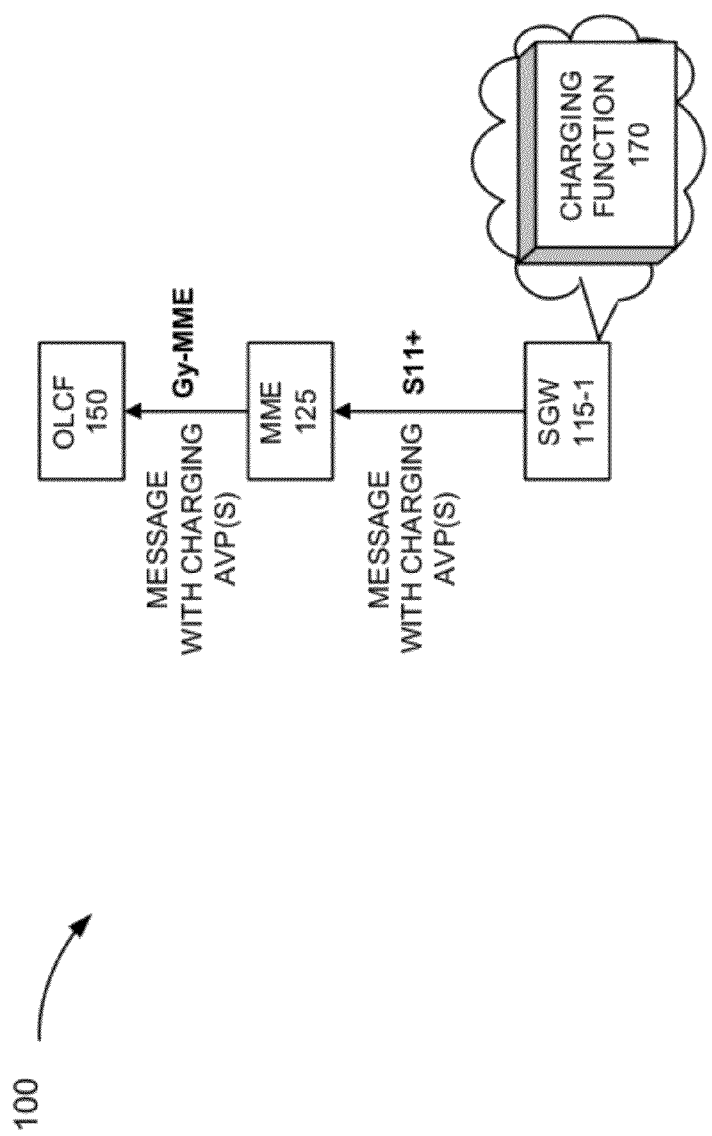

According to yet another implementation, the charging information may be sent to OLCF 150 via MME 125. For example, as illustrated in FIG. 5G, eNB 110-1 may send a message with charging AVP(s) to MME 125 via a modified S1-MME interface (S1-MME+). In turn, MME 125 may send a message with charging AVP(s) to OLCF 150 over a new Gy-MME interface. According to still another implementation, as illustrated in FIG. 5H, when data offloading is performed at SGW 115-1, SGW 115-1 may send a message with charging AVP(s) to MME 125 over a modified S11 interface (S11+). MME 125 may send a message with charging AVP(s) to OLCF 150 over a new Gy-MME interface.

According to other exemplary embodiments, data offloading may be extended to other devices (e.g., a HeNB, a UE-GW, some other type of wireless node, etc.). For example, users may be located within the same picocell, femtocell, etc. According to such instances, data offloaded charging may be extended to, for example, a HeNB or to a UE-GW.

Figure 6:
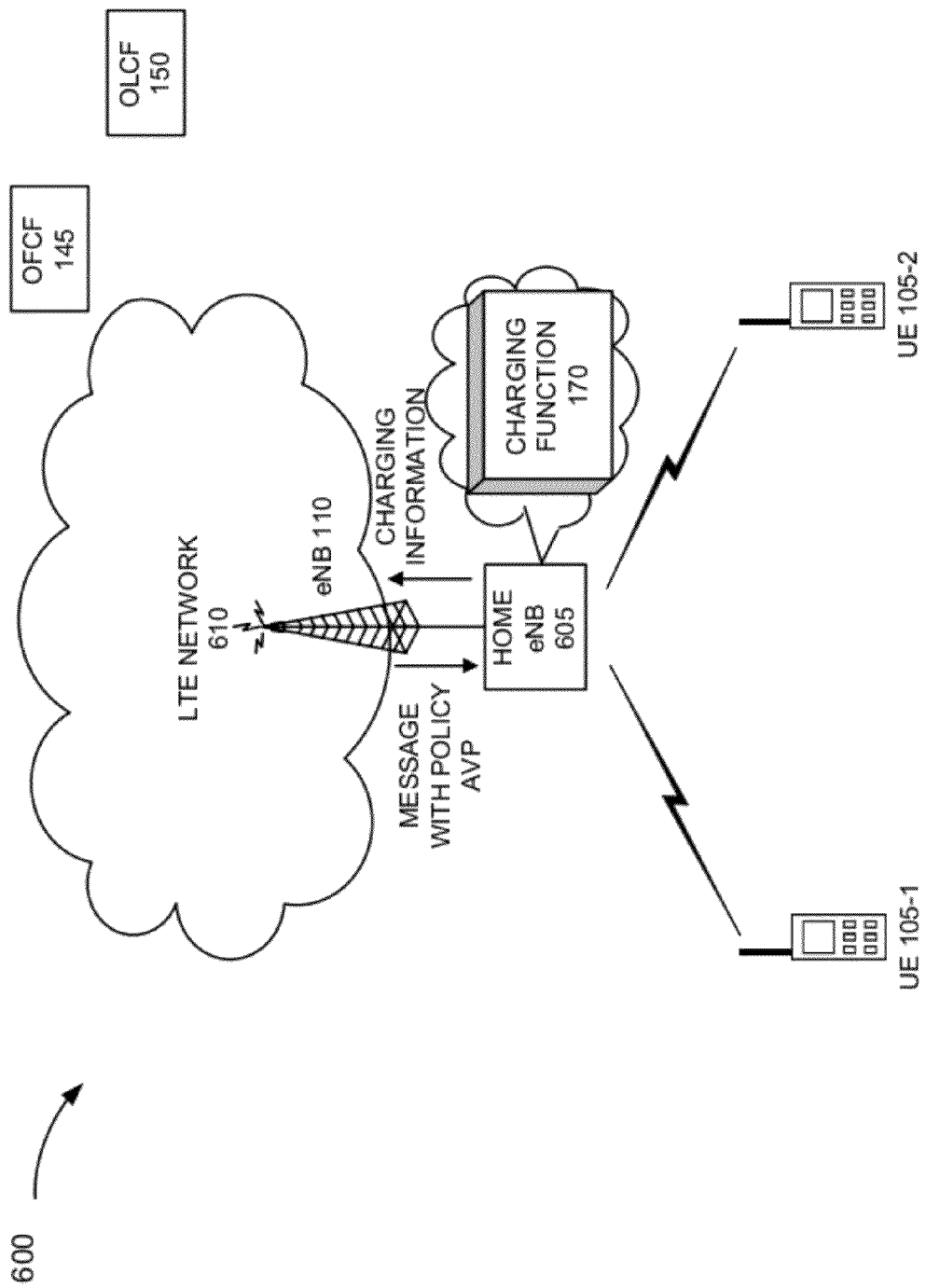
FIG. 6 is a diagram illustrating another exemplary network in which charging may be implemented with respect to data offloading.

FIG. 6 is a diagram illustrating another exemplary network 600 in which charging may be implemented with respect to data offloading. As illustrated, network 600 may include, among other devices and networks, UEs 105, a HeNB 605 that includes CF 170, eNB 110, and an LTE network 610.

The number of devices and configuration in network 600 is exemplary and provided for simplicity. In practice, network 600 may include more devices, fewer devices, different devices, and/or differently arranged devices than those illustrated in FIG. 6. For example, network 600 may include a gateway (e.g., a HeNB gateway), a relay node, a picocell, a radio node, a UE-GW, etc.

As illustrated, according to an exemplary implementation, the charging policies may be sent to HeNB 605 via eNB 110 in a message with policy AVP(s). CF 170 of HeNB 605 may send charging information to OFCF 145 and/or OLCF 150 via eNB 110.

Figure 7:
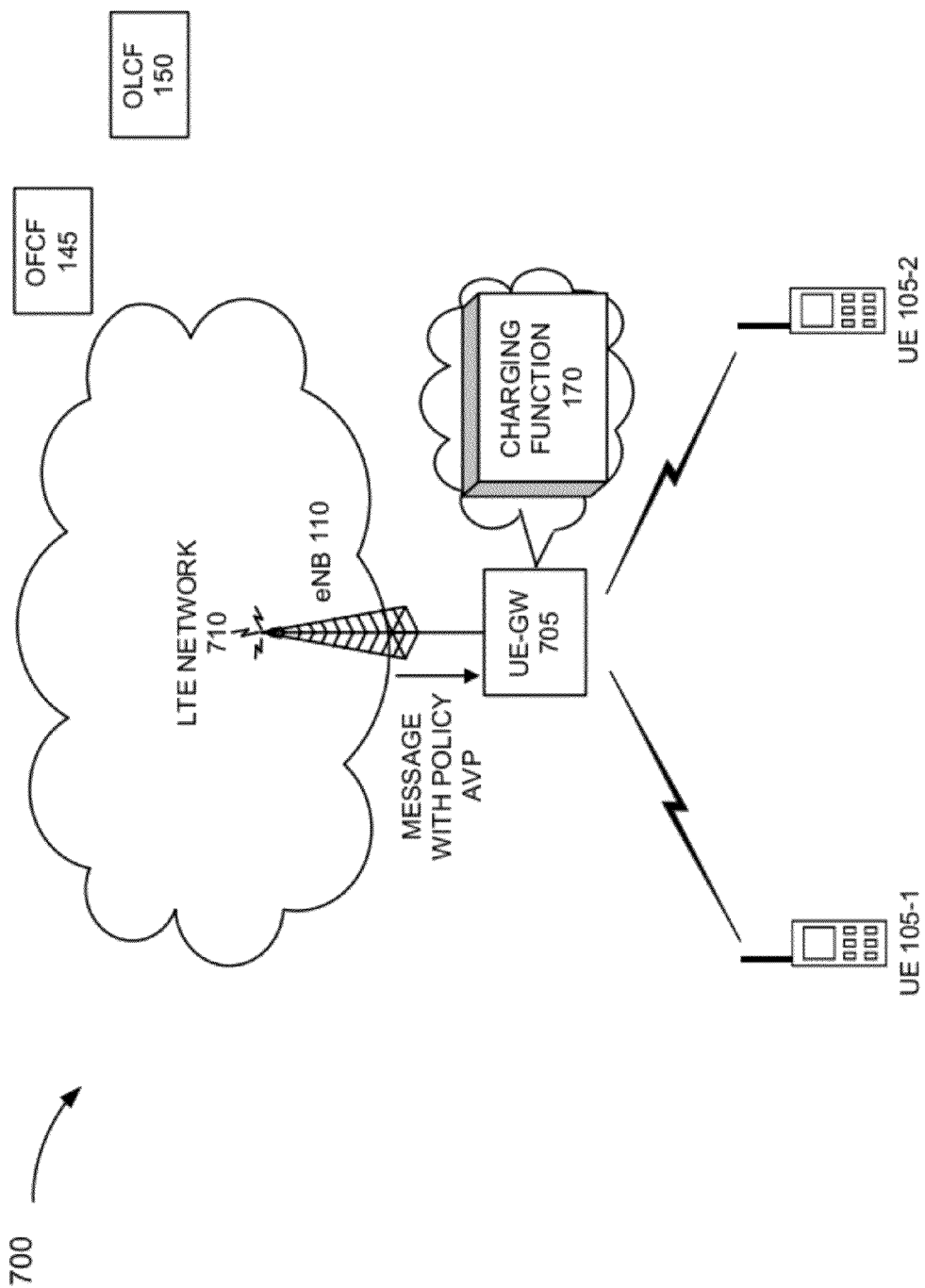
FIG. 7 is a diagram illustrating another exemplary network in which charging may be implemented with respect to data offloading.

FIG. 7 is a diagram illustrating another exemplary network 700 in which charging may be implemented with respect to data offloading. As illustrated, network 700 may include, among other devices and networks, UEs 105, a UE-GW 705 that includes CF 170, eNB 110, and an LTE network 710. UE-GW 705 may include a user device that has gateway functions in which a north-bound interface may have access to the LTE network and a south-bound interface may have access to any type of network, device, etc.

The number of devices and configuration in network 700 is exemplary and provided for simplicity. In practice, network 700 may include more devices, fewer devices, different devices, and/or differently arranged devices than those illustrated in FIG. 7. For example, network 700 may include a relay node, a picocell, a radio node, a HeNB, etc.

As illustrated, according to an exemplary implementation, the charging policies may be sent to UE-GW 705 via eNB 110 in a message with policy AVP(s). CF 170 of UE-GW 705 may send charging information to OFCF 145 and/or OLCF 150 via eNB 110.

Figure 8:
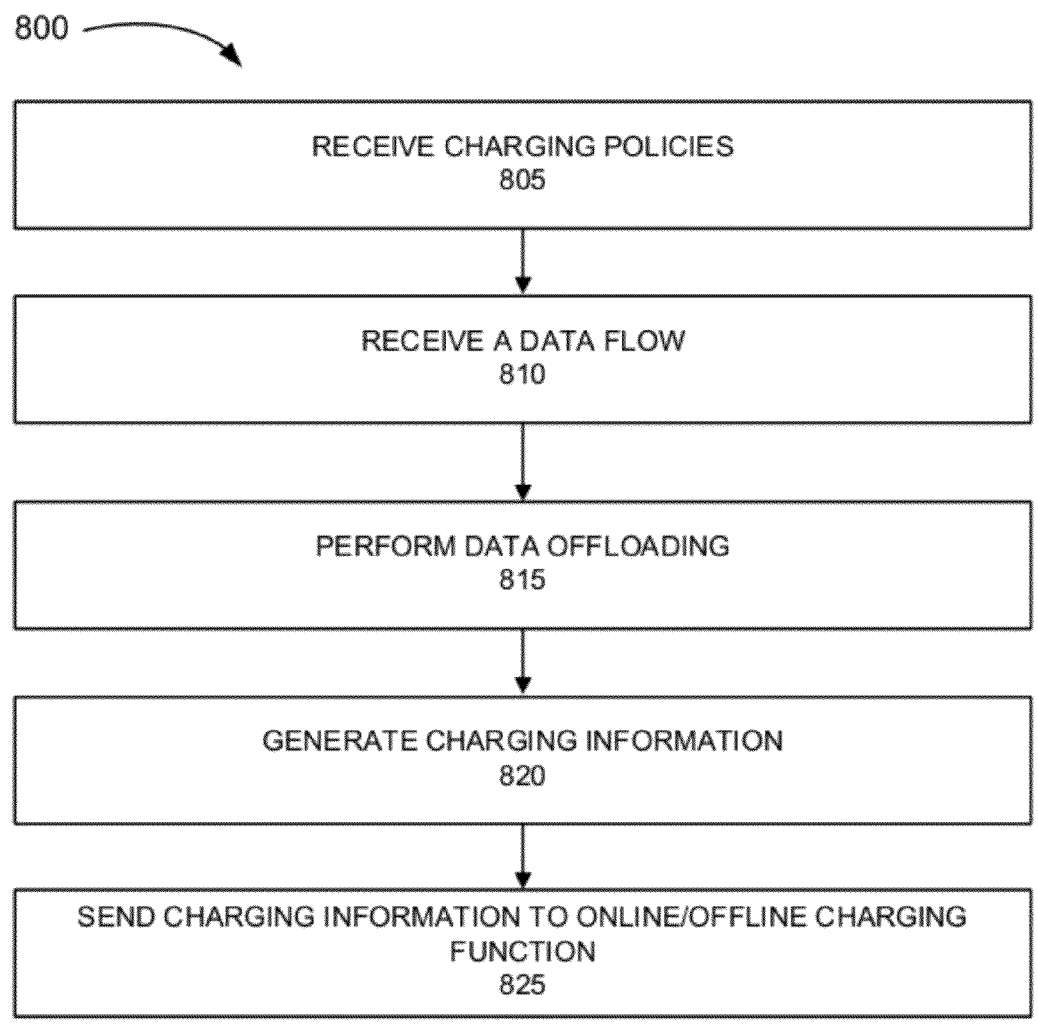
FIG. 8 is a flow diagram illustrating an exemplary process for charging in relation to data offloading.

FIG. 8 is a flow diagram illustrating an exemplary process 800 for charging in relation to data offloading. According to embodiments, process 800 may be performed by eNB 110 or SGW 115. According to other exemplary embodiments, process 800 may be performed by a different type of wireless node associated with a network.

Process 800 may include receiving charging policies (block 805). For example, as previously described, the wireless node may receive charging policies. For example, in an LTE environment, as illustrated in FIGS. 4A-4D, eNB 110 or SGW 115 may receive charging policies from PCRF 130, or from a neighbor eNB 110 or a neighbor SGW 115.

A data flow may be received (block 810). For example, as previously illustrated and described, the wireless node may receive a data flow. By way of example, the data flow may correspond to a mobile-to-mobile flow, a peer-to-peer application flow, or another type of data flow.

Data offloading may be performed (block 815). The wireless node may perform data offloading with respect to the data flow. For example, eNB 110 or SGW 115 may perform data offloading with respect to a data flow associated with UEs 105.

Charging information may be generated (block 820). For example, as previously described, CF 170 may generate charging information. The charging information stems from the data offloading services performed at the wireless node.

Charging information may be sent to an on-line/off-line charging function (block 825). For example, as previously described, the wireless node may send charging information to an online charging function and/or an offline charging function. For example, in an LTE environment, as illustrated in FIGS. 5A-5H, eNB 110 or SGW 115 may send charging information to OFCF 145 and/or OLCF 150.

Although FIG. 8 illustrates an exemplary process 800 for performing charging, according to other implementations, process 800 may include additional operations, fewer operations, and/or different operations than those illustrated in FIG. 8 and described.

The foregoing description of implementations provides illustration, but is not intended to be exhaustive or to limit the implementations to the precise form disclosed. Accordingly, modifications to the implementations described herein may be possible. For example, as previously described, data offloading may be implemented in networks other than LTE.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items.

In addition, while a series of blocks has been described with regard to the process illustrated in FIG. 8, the order of the blocks may be modified in other implementations. Further, non-dependent blocks may be performed in parallel. Additionally, with respect to other processes described in this description, the order of operations may be different and/or operations may be performed in parallel according to other implementations.

It will be apparent that the embodiments described herein may be implemented in many different forms of software or firmware in combination with hardware in the implementations illustrated in the figures. The actual software code (executable by hardware) or specialized control hardware used to implement the device, method, and/or system does not limit the disclosure of the invention. Thus, the operation and behavior of the devices and/or systems, or the performing of the methods was described without reference to the specific software code—it being understood that software and control hardware can be designed to implement the device, method, and/or system based on the description herein.

Further certain features described above may be implemented as "logic" or a "component" that performs one or more functions. This logic or component may include hardware, such as one or more processors, one or more microprocessors, one or more ASICs, one or more FPGAs, etc., a combination of hardware and software, or a combination with firmware, etc.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded as illustrative rather than restrictive.

No element, act, or instruction used in the present application should be construed as critical or essential to the implementations described herein unless explicitly described as such.

What is claimed is:

1. A method comprising:
   receiving, by a wireless node, charging policies for data offloading;
   performing, by the wireless node, data offloading with respect to a user data flow of a user device, wherein data offloading includes routing the user data flow to another user device via one of a lower layer traffic aggregation device relative to the wireless node, a lower hierarchical controlling device relative to the wireless node, or a peer wireless node relative to the wireless node, and without the data flow traversing any higher layer traffic aggregation device relative to the wireless node or any higher hierarchical controlling device relative to the wireless node;
   generating, by the wireless node, charging information based on the data offloading performed and the charging policies, wherein the charging information includes a charging record; and
   sending, by the wireless node, the charging information to at least one of an on-line charging function or an off-line charging function.

2. The method of claim 1, wherein the receiving comprises:
   receiving the charging policies from a higher layer traffic aggregation device relative to the wireless node.

3. The method of claim 1, further comprising:
   sending a policy request for the charging policies;
   receiving a policy response that includes the charging policies; and
   sending the policy response to the wireless node.

4. The method of claim 1, wherein the wireless node comprises one of an evolved Node-B, a serving gateway, a Node-B, a base station, or a radio node to which at least one user device is attached.

5. The method of claim 1, further comprising:
   sending the charging policies from the wireless node to a neighbor wireless node.

6. The method of claim 1, wherein the sending comprises:
   sending the charging information to the at least one of the on-line charging function or the off-line charging function via a higher layer traffic aggregation device relative to the wireless node.

7. The method of claim 6, wherein the higher layer traffic aggregation device includes one of a serving gateway, a packet data network gateway, or a mobility management entity.

8. The method of claim 1, further comprising:
   using messages with attribute value pairs to carry the charging policies and the charging information.

9. A wireless node comprising: one or more memories to store instructions; and
   one or more processors to execute the instructions in the one or more memories to:
   receive charging policies for data offloading;
   perform the data offloading with respect to a data flow of a user device, wherein data offloading includes routing the data flow to another user device via one of a lower layer traffic aggregation device relative to the wireless node, a lower hierarchical controlling device relative to the wireless node, or a peer wireless node relative to the wireless node, and without the data flow traversing any higher layer traffic aggregation device relative to the wireless node or any higher hierarchical controlling device relative to the wireless node;
   generate charging information based on the data offloading performed and the charging policies, wherein the charging information includes a charging record; and
   send the charging information to at least one of an on-line charging function or an off-line charging function.

10. The wireless node of claim 9, wherein the wireless node comprises one of an evolved Node-B, a serving gateway, a Node-B, a base station, or a radio node to which at least one user device is attached.

11. The wireless node of claim 9, wherein the one or more processors are to execute instructions to:
    send the charging policies from the wireless node to a neighbor wireless node based on a handover process.

12. The wireless node of claim 9, wherein the one or more processors are to execute instructions to:
    send the charging information to the at least one of the on-line charging function or the off-line charging function via a higher layer traffic aggregation device relative to the wireless node.

13. The wireless node of claim 9, wherein the one or more processors are to execute instructions to:
    receive the charging policies from a higher layer traffic aggregation device relative to the wireless node.

14. The wireless node of claim 9, wherein, when sending the charging information, the one or more processors are to execute instructions to:
    use a message with one or more charging attribute value pairs to carry the charging information associated with the data offloading.

15. The wireless node of claim 9, wherein, when receiving the charging policies, the one or more processors are to execute instructions to:
    receive a message with one or more policy attribute value pairs.

16. The wireless node of claim 9, wherein the one or more processors are to execute instructions to:
    send the charging policies from the wireless node to a neighbor wireless node when the data offloading includes a destination address associated with a user device that is attached to the neighbor wireless node.

17. A non-transitory storage medium storing instructions executable by at least one processor of a wireless node, the non-transitory storage medium storing instructions for:
    receiving charging policies for data offloading;

performing the data offloading with respect to a data flow of a user device, wherein data offloading includes routing the data flow to another user device via one of a lower layer traffic aggregation device relative to the wireless node, a lower hierarchical controlling device relative to the wireless node, or a peer wireless node relative to the wireless node, and without the data flow traversing any higher layer traffic aggregation device relative to the wireless node or any higher hierarchical controlling device relative to the wireless node;

generating charging information based on the data offloading performed and the charging policies, wherein the charging information includes a charging record; and sending the charging information to at least one of an on-line charging function or an off-line charging function.

18. The non-transitory storage medium of claim 17, further comprising one or more instructions for:

receiving the charging policies from a higher layer traffic aggregation device relative to the wireless node.

19. The non-transitory storage medium of claim 17, further comprising one or more instructions for:

sending the charging information to the at least one of the on-line charging function or the off-line charging function via a higher layer traffic aggregation device relative to the wireless node.

20. The non-transitory storage medium of claim 17, further comprising one or more instructions for:

sending the charging policies from the wireless node to a neighbor wireless node during a handover process or when the data offloading involves the neighbor wireless node.

* * * * *